(12) United States Patent
Uchiyama et al.

(10) Patent No.: US 7,232,068 B2
(45) Date of Patent: Jun. 19, 2007

(54) NON-CONTACT IC CARD READER/WRITER DEVICE, NON-CONTACT IC CARD, INPUT DEVICE, AND METHOD OF CALCULATING LOCATION OF NON-CONTACT IC CARD

(75) Inventors: Takuya Uchiyama, Shinagawa (JP); Satoshi Sakurai, Shinagawa (JP); Nobuo Yatsu, Shinagawa (JP); Norio Endo, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 52 days.

(21) Appl. No.: 10/625,772

(22) Filed: Jul. 24, 2003

(65) Prior Publication Data

US 2004/0195324 A1    Oct. 7, 2004

(30) Foreign Application Priority Data

Oct. 11, 2002   (JP)   ............................. 2002-299171

(51) Int. Cl.
*G06K 7/08* (2006.01)
*G06K 5/00* (2006.01)
*G06K 19/00* (2006.01)

(52) U.S. Cl. ................ 235/451; 235/380; 235/382; 235/487

(58) Field of Classification Search ........ 235/449–451, 235/492, 472.02, 493, 435, 375, 380, 382, 235/487; 340/572.1, 825.36, 425.49, 439.13, 340/686.1, 5.61, 10.1; 342/42
See application file for complete search history.

(56) References Cited

U.S. PATENT DOCUMENTS

| 5,432,328 | A | * | 7/1995 | Yamaguchi | 235/449 |
| 5,594,448 | A | * | 1/1997 | d'Hont | 342/44 |
| 5,619,207 | A | * | 4/1997 | d'Hont | 342/42 |
| 5,686,902 | A | * | 11/1997 | Reis et al. | 340/10.2 |
| 5,698,838 | A | * | 12/1997 | Yamaguchi | 235/492 |
| 5,714,932 | A | * | 2/1998 | Castellon et al. | 340/539.11 |
| 5,804,811 | A | * | 9/1998 | Saitoh et al. | 235/492 |
| 5,831,597 | A | * | 11/1998 | West et al. | 345/163 |
| 5,952,641 | A | * | 9/1999 | Korshun | 235/382 |
| 6,055,592 | A | * | 4/2000 | Smith | 710/73 |
| 6,127,917 | A | * | 10/2000 | Tuttle | 340/10.1 |
| 6,204,765 | B1 | * | 3/2001 | Brady et al. | 340/572.1 |
| 6,257,486 | B1 | * | 7/2001 | Teicher et al. | 235/380 |

(Continued)

FOREIGN PATENT DOCUMENTS

JP    2000-46939    2/2000

(Continued)

OTHER PUBLICATIONS

Position Monitoring with Hall Effect Sensors (http://www.sensorsmag.com/articles/0902/52/main.shtml) Sep. 2002.*

*Primary Examiner*—Daniel Walsh
(74) *Attorney, Agent, or Firm*—Staas & Halsey LLP

(57) ABSTRACT

A non-contact IC card reader/writer device includes antennas that perform carrier wave transmission and reception with a non-contact IC card, an A/D converter that detects the voltage level of each carrier wave received from the non-contact IC card through the antennas, and a control unit that calculates the location of the non-contact IC card from the voltage levels detected by the A/D converter.

9 Claims, 19 Drawing Sheets

U.S. PATENT DOCUMENTS

| | | | |
|---|---|---|---|
| 6,427,065 B1* | 7/2002 | Suga et al. | 455/41.1 |
| 6,456,239 B1* | 9/2002 | Werb et al. | 342/463 |
| 6,473,028 B1* | 10/2002 | Luc | 342/118 |
| 6,483,427 B1* | 11/2002 | Werb | 340/10.1 |
| 6,629,637 B1* | 10/2003 | Von Der Lippe et al. | 235/451 |
| 6,686,881 B1* | 2/2004 | Lu et al. | 342/458 |
| 6,788,199 B2* | 9/2004 | Crabtree et al. | 340/539.13 |
| 2001/0028302 A1* | 10/2001 | Degrauwe et al. | 340/10.5 |
| 2002/0118097 A1* | 8/2002 | Heinrich et al. | 340/10.32 |
| 2002/0130778 A1* | 9/2002 | Nicholson | 340/572.1 |
| 2003/0001726 A1* | 1/2003 | Moore | 340/10.3 |
| 2003/0052788 A1* | 3/2003 | Kwong-Tai Chung | 340/573.1 |
| 2003/0058107 A1* | 3/2003 | Ferrier et al. | 340/571 |
| 2004/0036623 A1* | 2/2004 | Chung | 340/825.49 |
| 2004/0113791 A1* | 6/2004 | Salim et al. | 340/572.3 |
| 2004/0140906 A1* | 7/2004 | Fujimoto | 340/825.49 |
| 2004/0195324 A1* | 10/2004 | Uchiyama et al. | 235/451 |
| 2004/0203846 A1* | 10/2004 | Caronni et al. | 455/456.1 |
| 2004/0250116 A1* | 12/2004 | Strickland et al. | 713/201 |
| 2005/0007343 A1* | 1/2005 | Butzer | 345/163 |
| 2005/0033992 A1* | 2/2005 | Inabe | 713/202 |
| 2005/0088286 A1* | 4/2005 | Heinrich et al. | 340/10.51 |
| 2005/0110640 A1* | 5/2005 | Chung | 340/572.1 |
| 2006/0236022 A1* | 10/2006 | Van Epps, Jr. | 711/100 |

FOREIGN PATENT DOCUMENTS

| | | | |
|---|---|---|---|
| JP | 2000-046939 | * | 2/2000 |
| JP | 2000-090215 | * | 3/2000 |

* cited by examiner

NON-CONTACT IC CARD READER/WRITER DEVICE, NON-CONTACT IC CARD, INPUT DEVICE, AND METHOD OF CALCULATING LOCATION OF NON-CONTACT IC CARD

BACKGROUND OF THE INVENTION

1. Field of the Invention

The present invention generally relates to a non-contact IC card reader/writer device, a non-contact IC card, an input device, and a method of calculating the location of a non-contact IC card, and more particularly, to a non-contact IC card reader/writer device that performs communication by means of data strings produced by amplitude modulation of each carrier wave generated through antennas.

2. Description of the Related Art

Referring to FIGS. 1 through 5, a conventional non-contact IC card will be described below. FIG. 1 is a block diagram of a conventional non-contact IC card reader/writer device 600 and a non-contact IC card 610.

The non-contact IC card reader/writer device 600 includes an external interface unit 601, a control unit 602, and a transmission/reception block 603. The control unit 602 controls the entire non-contact IC card reader/writer device 600, and performs data transmission and reception with a host device (not shown) via the external interface unit 601. The transmission/reception block 603 includes an antenna 604, a transmission unit 605, and a reception unit 606.

The antenna 604 is a coil antenna, for example, and performs carrier wave transmission and reception with the non-contact IC card 610. The transmission unit 605 modulates transmission data supplied from the control unit 602, and amplifies the modulated signal. Based on the amplified output signal, alternating current is supplied to the antenna 604 to generate an electromagnetic wave. The reception unit 606 amplifies each signal received through the antenna 604, and demodulates the amplified signal to obtain reception data. The reception data are outputted to the control unit 602. Data communication through amplitude modulation of each carrier wave is performed between the non-contact IC card reader/writer device 600 and the non-contact IC card 610.

FIG. 2 illustrates a reception wave in the non-contact IC card 610 and the non-contact IC card reader/writer device 600. As shown in FIG. 2, the non-contact IC card reader/writer device 600 and the non-contact IC card 610 rectify the alternating-current component of each reception wave to a direct-current component, and determine a data string from the intensity of the direct-current component. In a communication operation from the non-contact IC card reader/writer device 600 to the non-contact IC card 610, each carrier wave is amplified and modulated in accordance with the bit order of data to be transmitted.

FIG. 3 illustrates a reception waveform in the non-contact IC card 610. The non-contact IC card 610 determines each data string from the intensity of voltage after rectification. In a communication operation from the non-contact IC card 610 to the non-contact IC card reader/writer device 600, an internal logic switch that will be described later is switched on and off, in accordance with the bit order of data for transmitting each carrier wave received from the non-contact IC card reader/writer device 600.

FIG. 4 illustrates communication between the non-contact IC card reader/writer 600 and the non-contact IC card 610. As can be seen from FIG. 4, the non-contact IC card reader/writer device 600 and the non-contact IC card 610 have loop-coil antennas 604 and 611, respectively. The non-contact IC card 610 includes a logic switch 612 that can change load capacities of the loop-coil antenna 611. When data transmission is performed, the logic switch 612 is switched in accordance with the data string. Data transmission and reception are performed through electromagnetic coupling between the loop-coil antenna 604 of the non-contact IC card reader/writer device 600 and the loop-coil antenna 611 of the non-contact IC card 610. The loop-coil antennas 604 and 611 are used in both transmission and reception.

FIG. 5 illustrates changes in a carrier wave in the non-contact IC card reader/writer device 600. As the logic switch 612 of the non-contact IC card 610 is switched on and off to change load capacities, the non-contact IC card reader/writer device 600 can monitor the changes in a carrier wave shown in FIG. 5. The non-contact IC card reader/writer device 600 determines the data string from the voltage intensity, and thereby performs data communication.

As another conventional technique, Japanese Unexamined Patent Publication No. 2000-46939 discloses a wireless card location detecting system. This wireless card location detecting system includes: a wireless base station that transmits electric waves; a wireless card that receives each of the electric waves and measures the electric field intensity; a control device; and a database that stores electric field intensity distribution data. The wireless card divides electric waves into vertical polarized wave components and horizontal polarized wave components, and measures the electric field intensities of those components. The control device compares the measurement results of the vertical polarized wave components with the data stored in the database, and determines a first group of spots at which the wireless card might be situated. The control device also compares the measurement results of the horizontal polarized wave components with the data stored in the database, and determines a second group of spots at which the wireless card might be situated. The location of the wireless card is detected from the product set of the first group of spots and the second group of spots.

The conventional non-contact IC card reader/writer device 600 and the conventional non-contact IC card 610, however, only have data exchanging means. It is therefore necessary to employ a separate input device, so that a user can operate a device into which the non-contact IC card reader/writer device 600 is incorporated, such as an ATM.

An ATM is normally equipped with a touch panel as an input device. However, since such an input device is integrally formed with the screen of the ATM, it is necessary to lower the screen to a position in which an operator can easily operate the screen, or to raise the screen (the operating position) to a position in which an operator can easily view the screen. As a result, either the visibility or the operability of the screen is abandoned. With the technique disclosed in Japanese Unexamined Patent Publication No. 2000-46939, there is another problem that the production costs are even higher due to the database that is separately required.

SUMMARY OF THE INVENTION

It is therefore an object of the present invention to provide a non-contact IC card reader/writer device, a non-contact IC card, an input device, and a method of calculating the location of a non-contact IC card in which the above disadvantage is eliminated.

A more specific object of the present invention is to provide a non-contact IC card reader/writer device that does not need to employ an input device other than a non-contact IC card, and does not reduce the visibility and the operability. Another specific object of the present invention is to provide a non-contact IC card and an input device used in conjunction with the non-contact IC card reader/writer device, and a method of calculating the location of the non-contact IC card.

The above objects of the present invention are achieved by a non-contact IC card reader/writer device comprising: antennas that perform transmission and reception of carrier waves between the non-contact IC card reader/writer device and a non-contact IC card; a detector that detects the voltage level of each of the carrier waves received from the non-contact IC card via the antennas; and a control unit that calculates the location of the non-contact IC card, based on the detected voltage levels detected by the detector.

The above objects of the present invention are also achieved by a non-contact IC card reader/writer device comprising: antennas that perform transmission and reception of carrier waves between the non-contact IC card reader/writer device and a non-contact IC card; and a control unit that alternately drives the antennas, obtains location information from the non-contact IC card, and calculates the location of the non-contact IC card.

The above objects of the present invention are also achieved by a non-contact IC card reader/writer device comprising: antennas that are arranged in a matrix on one plane, and perform transmission and reception of carrier waves between the non-contact IC card reader/writer device and a non-contact IC card; and a control unit that sequentially drives the antennas, and calculates the location of the non-contact IC card based on the distribution of the locations of antennas that have received a response from the non-contact IC card.

The above objects of the present invention are achieved by a non-contact IC card reader/writer device comprising: antennas that are arranged in a matrix on one plane, and perform transmission and reception of carrier waves between the non-contact IC card reader/writer device and a non-contact IC card; a detector that drives all the antennas at once, and detects the voltage level of each of the carrier waves received from the non-contact IC card via the antennas; and a control unit that calculates the location of the non-contact IC card, based on the voltage levels detected by the detector and the locations of antennas that have received the carrier waves.

The above objects of the present invention are also achieved by a non-contact IC card reader/writer device comprising: antennas that perform transmission and reception of carrier waves between the non-contact IC card reader/writer device and a non-contact IC card; a positioning sensor that optically detects the location of the non-contact IC card; and a control unit that detects the location of the non-contact IC card from the location information of the non-contact IC card detected by the positioning sensor.

The above objects of the present invention are also achieved by a non-contact IC card reader/writer device comprising: antennas that perform transmission and reception of carrier waves between the non-contact IC card reader/writer device and a non-contact IC card; Hall elements that are respectively provided to the antennas, and detect changes in field intensity on the plane of the antennas; and a control unit that detects the location of the non-contact IC card, based on the field intensity changes detected by the Hall elements.

The above objects of the present invention are also achieved by an input device comprising a non-contact IC card reader/writer device including: antennas that perform transmission and reception of carrier waves between the non-contact IC card reader/writer device and a non-contact IC card; a detector that detects the voltage level of each of the carrier waves received from the non-contact IC card via the antennas; and a control unit that calculates the location of the non-contact IC card, based on the detected voltage levels detected by the detector.

The above objects of the present invention are also achieved by a non-contact IC card comprising: an antenna that receives a carrier wave supplied from an outside device that calculates the location of the non-contact IC card, the carrier wave being inversely proportional to the distance from the outside device; a detector that detects the voltage level of the carrier wave received through the antenna; and a control unit that transmits the voltage level detected by the detector to the outside device.

The above objects of the present invention are also achieved by an input device comprising a non-contact IC card that includes: an antenna that receives a carrier wave supplied from an outside device that calculates the location of the non-contact IC card, the carrier wave being inversely proportional to the distance from the outside device; a detector that detects the voltage level of the carrier wave received through the antenna; and a control unit that transmits the voltage level detected by the detector to the outside device.

The above objects of the present invention are also achieved by a method of detecting the location of a non-contact IC card, comprising the steps of: performing carrier wave transmission and reception with the non-contact IC card through antennas; detecting the voltage level of each carrier wave received from the non-contact IC card through the antennas; and calculating the location of the non-contact IC card, based on the voltage levels detected in the detecting step.

The above objects of the present invention are also achieved by a method of calculating the location of a non-contact IC card, comprising the steps of: performing carrier wave transmission and reception with the non-contact IC card through antennas; and calculating the location of the non-contact IC card from location information obtained from the non-contact IC card through alternate driving of the antennas.

The above objects of the present invention are also achieved by a method of calculating the location of a non-contact IC card, comprising the steps of: performing carrier wave transmission and reception with the non-contact IC card through sequential driving of antennas arranged in a matrix on one plane; and calculating the location of the non-contact IC card, based on distribution of the locations of antennas that have received a response from the non-contact IC card.

The above objects of the present invention are also achieved by a method of calculating the location of a non-contact IC card, comprising the steps of: performing carrier wave transmission and reception with the non-contact IC card through simultaneous driving of antennas arranged in a matrix on one plane; detecting the voltage level of each carrier wave received from the non-contact IC card through the antennas; and calculating the location of the non-contact IC card, based on the voltage levels detected in the detecting step and the locations of antennas that have received the carrier waves.

The above objects of the present invention are also achieved by a method of calculating the location of a non-contact IC card, comprising the steps of: optically detecting the location of the non-contact IC card with a positioning sensor; and calculating the location of the non-contact IC card, based on location information of the non-contact IC card detected with the positioning sensor.

The above objects of the present invention are also achieved by a method of calculating the location of a non-contact IC card, comprising the steps of: performing carrier wave transmission and reception with the non-contact IC card through antennas; detecting a field intensity change on the plane of the antennas with Hall elements corresponding to the antennas; and calculating the location of the non-contact IC card, based on the field intensity change detected with the Hall elements.

The above objects of the present invention are also achieved by a method of calculating the location of a non-contact IC card, comprising the steps of: receiving each carrier wave supplied from an outside device that calculates the location of the non-contact IC card through an antenna provided in the non-contact IC card; detecting the voltage level of the carrier wave received through the antenna; and transmitting the voltage level detected in the detecting step to the outside device.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments of the present invention, with reference to the accompanying drawings.

(First Embodiment)

Figure 1:
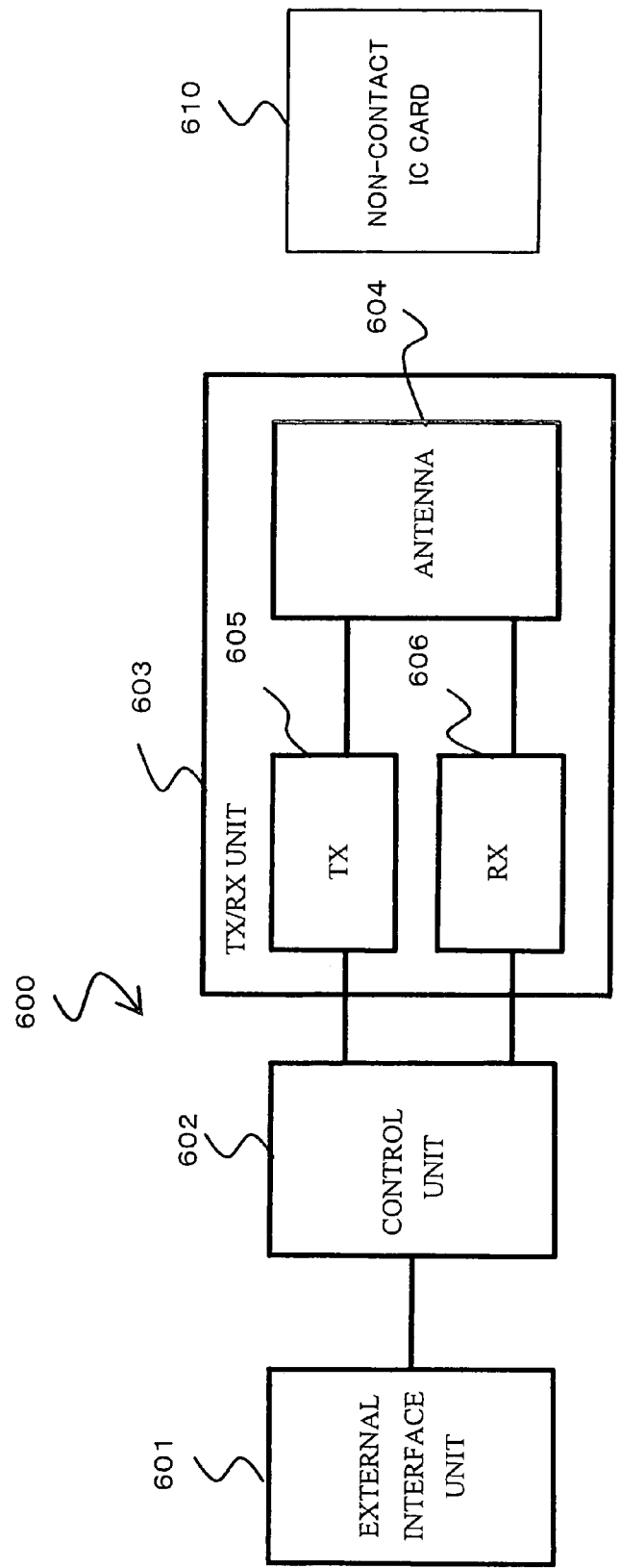
FIG. 1 is a block diagram illustrating a conventional non-contact IC card reader/writer device and a conventional non-contact IC card.
Figure 2:
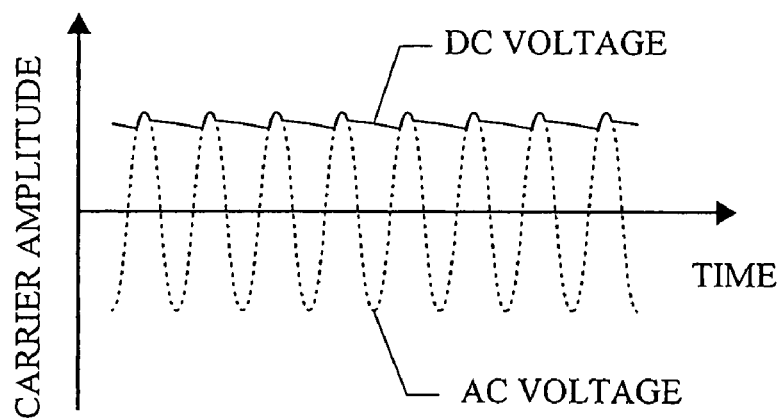
FIG. 2 illustrates a reception wave in the conventional non-contact IC card and the conventional non-contact IC card reader/writer device.
Figure 3:
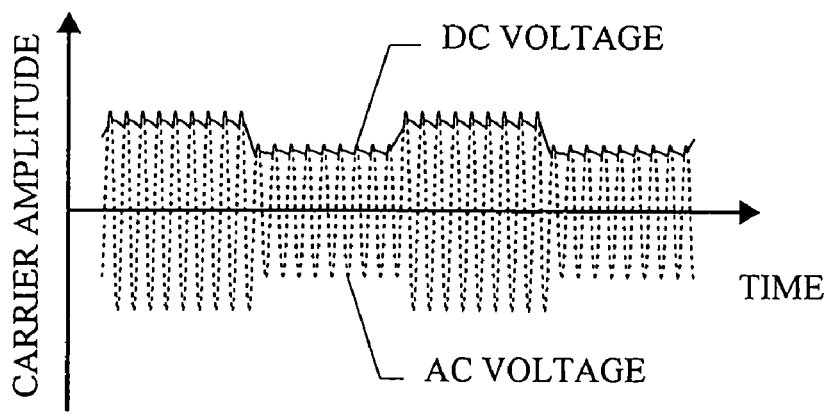
FIG. 3 illustrates a reception waveform in the conventional non-contact IC card.
Figure 4:
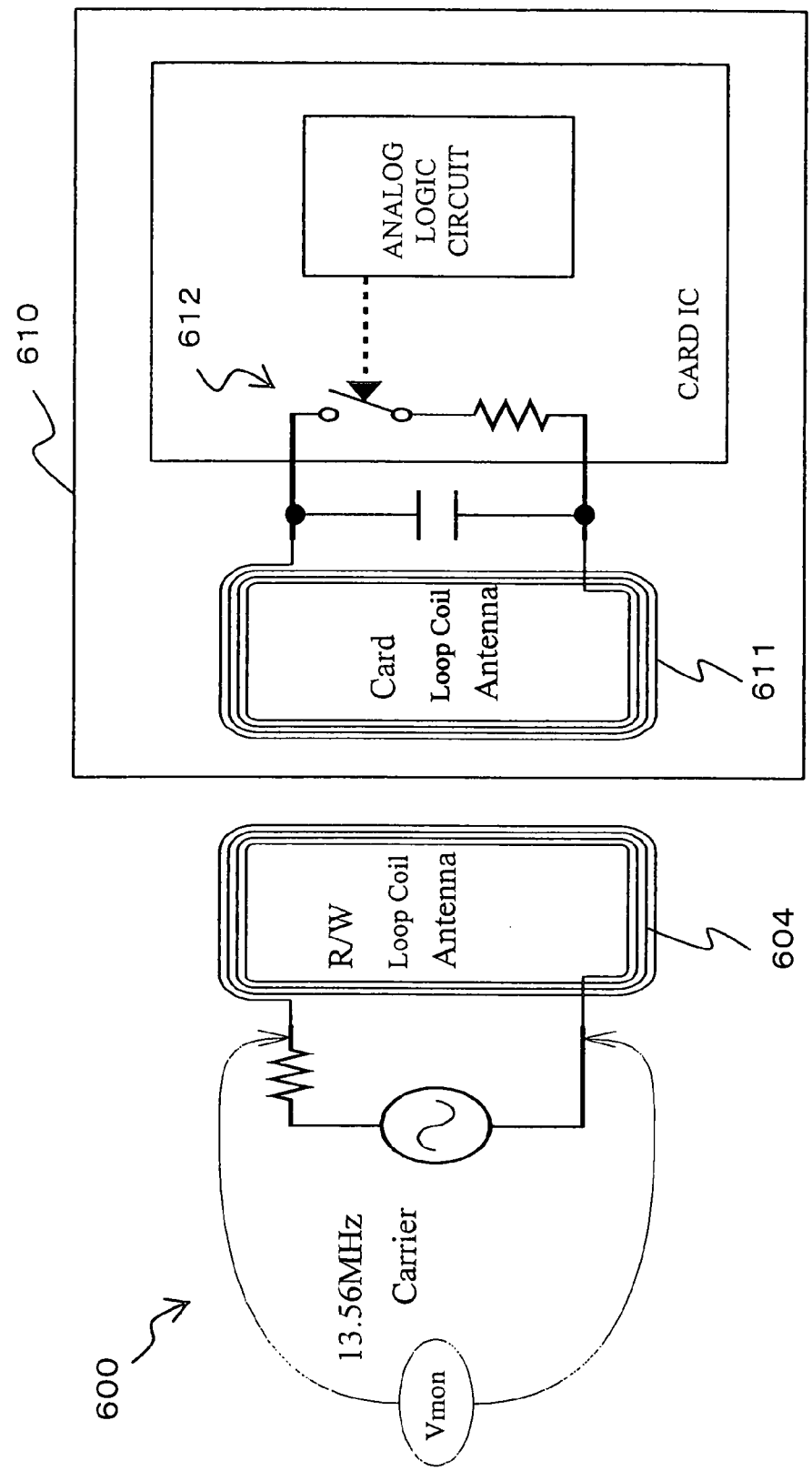
FIG. 4 illustrates communication between the conventional non-contact IC card reader/writer device and the conventional non-contact IC card.
Figure 5:
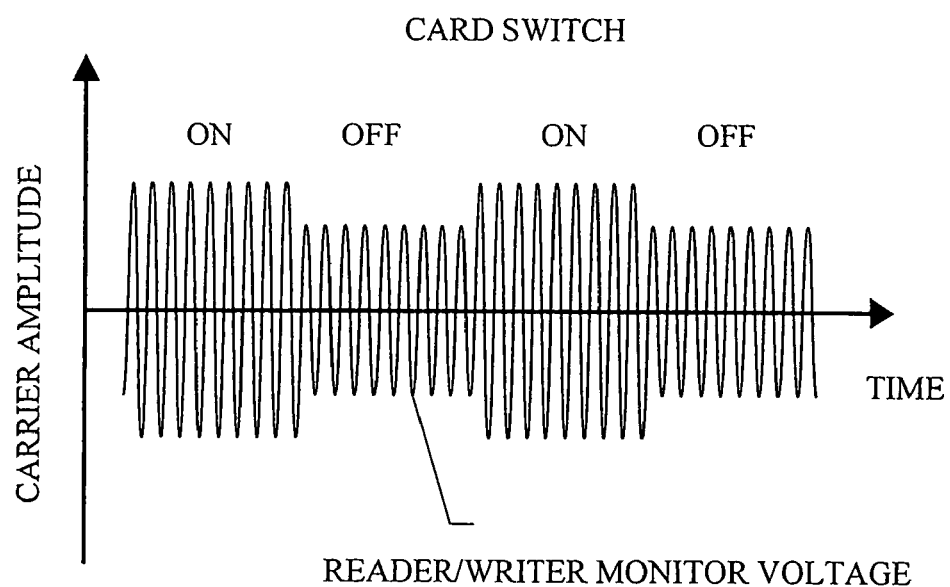
FIG. 5 illustrates changes in a carrier wave in the conventional non-contact IC card reader/writer device.
Figure 6:
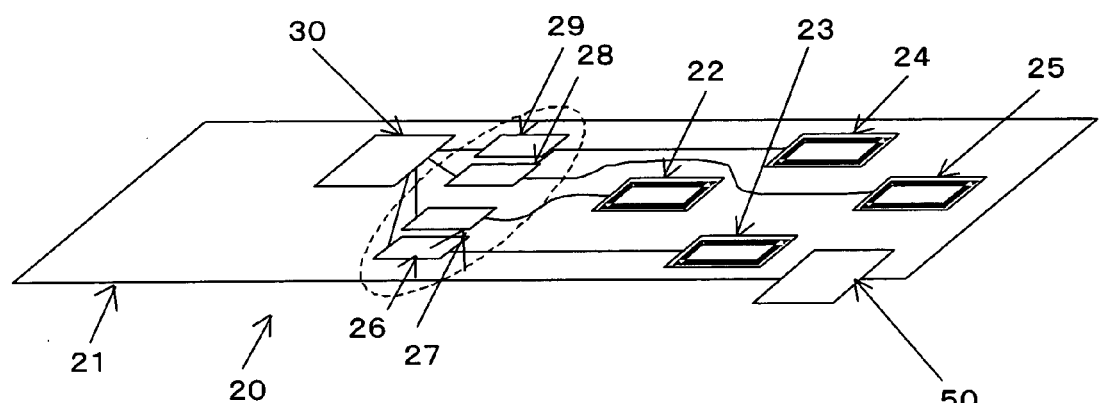
FIG. 6 illustrates a non-contact IC card system in accordance with a first embodiment of the present invention.

FIG. 6 illustrates a non-contact IC card system in accordance with a first embodiment of the present invention. As can be seen from FIG. 6, the non-contact IC card system 10 includes a non-contact IC card reader/writer device 20 that detects the location of a non-contact IC card 50, and the non-contact IC card 50 that can be used as a mouse and has a pointing function. The non-contact IC card reader/writer device 20 includes a mouse pad 21, antennas 22 through 25, transmission/reception units 26 through 29, and a control unit 30.

The antennas 22 through 25 are loop antennas, and are arranged on the mouse pad 21. The transmission/reception units 26 through 29 transmit information and power to the non-contact IC card 50 via the antennas 22 through 25. The transmission/reception units 26 through 29 also receive information from the non-contact IC card 50 via the antennas 22 through 25. The control unit 30 controls the entire non-contact IC card reader/writer device 20. The control unit 30 also detects the location of the non-contact IC card 50, and controls the power supply to the non-contact IC card 50, so as to limit the power supply to the smallest possible quantity required for communication.

Figure 7:
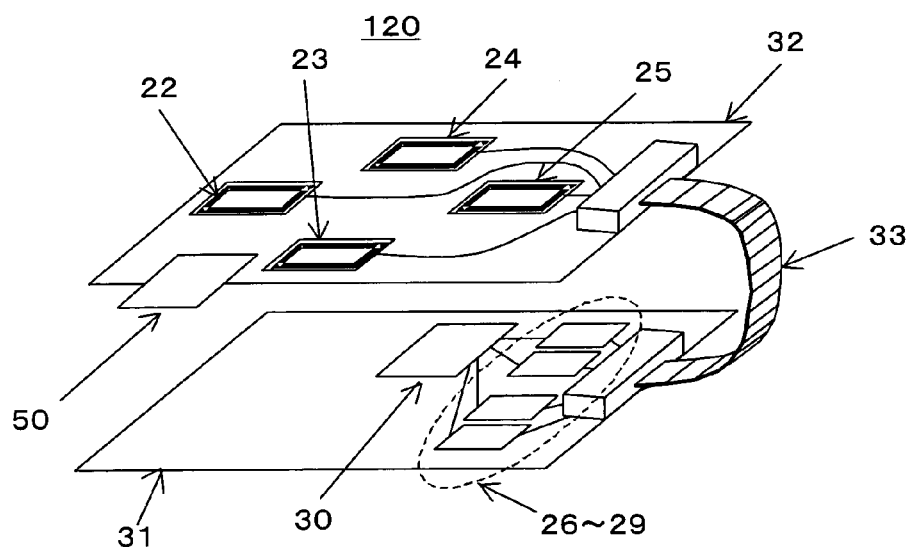
FIG. 7 illustrates another example structure of a non-contact IC card reader/writer device in accordance with the first embodiment.

FIG. 7 illustrates another example of a non-contact IC card reader/writer device. In the non-contact IC card reader/writer device 20 shown in FIG. 6, the antennas 22 through 25 and the control unit 30 are integrally formed on the mouse pad 21. In the non-contact IC card reader/writer device 120 shown in FIG. 7, on the other hand, mouse pads 31 and 32 separate the antennas 22 through 25 from the control unit 30. In this structure, the antennas 22 through 25 are connected to the control unit 30 via a cable 33.

Although the four antennas 22 through 25 are shown in FIGS. 6 and 7, the number of antennas may be changed in this embodiment. Also, the circuits in the antennas are connected to the control unit 30 with a wiring pattern or cables, though the details of the circuit connections of the antennas may vary with situations.

Figure 8:
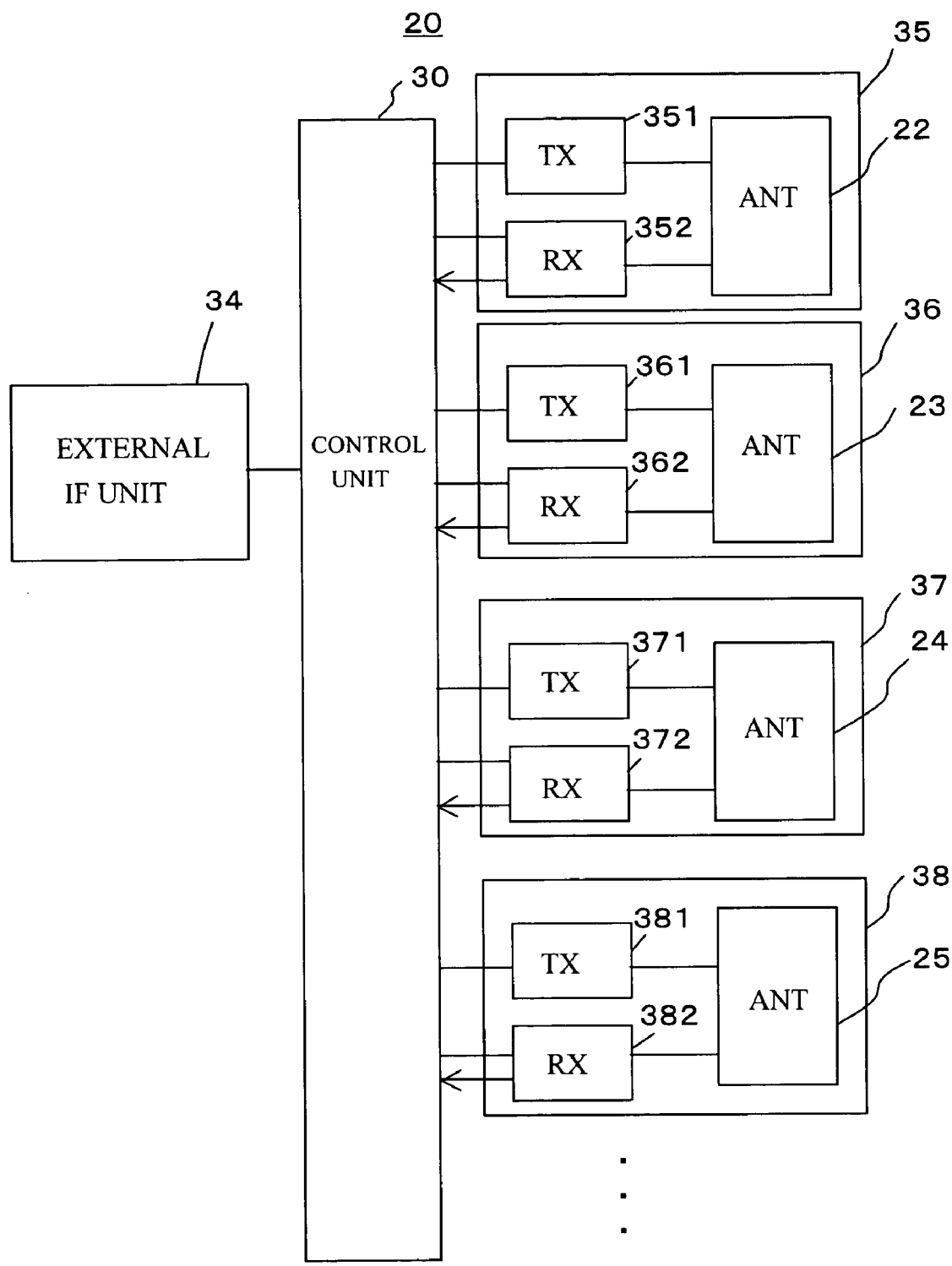
FIG. 8 is a block diagram of the non-contact IC card reader/writer device shown in FIG. 6.

Next, the non-contact IC card reader/writer device 20 (or 120) shown in FIGS. 6 and 7 will be described. FIG. 8 is a block diagram of the non-contact IC card reader/writer device 20. As can be seen from FIG. 8, the non-contact IC card reader/writer device 20 includes an external interface unit 34, the control unit 30, and transmission/reception blocks 35 through 38. In FIG. 8, the same components as the components in FIGS. 6 and 7 are denoted by the same reference numerals as the corresponding reference numerals in FIGS. 6 and 7, and only four transmission blocks are shown.

The external interface unit 34 performs data transmission and reception with a host device (not shown) via a cable or the like. The transmission/reception blocks 35 through 38 include transmission units 351, 361, 371, and 381, reception units 352, 362, 372, and 382, and antennas 22, 23, 24, and 25, respectively. Here, the transmission unit 351 and the reception unit 352 correspond to the transmission/reception unit 26 shown in FIG. 6, the transmission unit 361 and the reception unit 362 correspond to the transmission/reception unit 27, the transmission unit 371 and the reception unit 372 correspond to the transmission/reception unit 28, and the transmission unit 381 and the reception unit 382 correspond to the transmission/reception unit 29.

Figure 9:
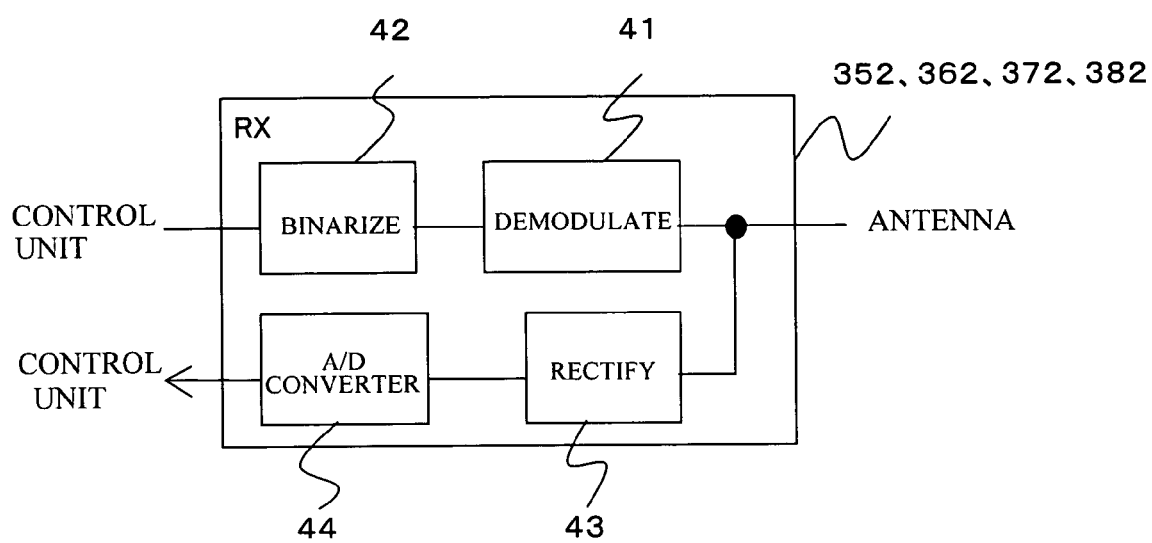
FIG. 9 illustrates the inner structure of each reception unit of the non-contact IC card reader/writer device.

Next, the inner structure of each of the reception units 352, 362, 372, and 382 shown in FIG. 8 will be described. FIG. 9 illustrates the inner structure of each of the reception units 352, 362, 372, and 382. As can be seen from FIG. 9, each of the reception units 352, 362, 372, and 382 includes a demodulating circuit 41, a binarizing circuit 42, a rectifying circuit 43, and an A/D converter 44.

The demodulating circuit 41 demodulates each carrier wave received at the antennas 22, 23, 24, and 25, and outputs demodulated reception data to the binarizing circuit 42. The binarizing circuit 42 converts the demodulated reception data outputted from the demodulating circuit 41, and outputs the converted reception data to the control unit 30. The rectifying circuit 43 rectifies each carrier wave received through the antennas 22, 23, 24, and 25, and extracts necessary direct-current components. The A/D converter 44 detects the voltage level of the output of the rectifying circuit 43, and outputs the detected voltage level to the control unit 30.

Figure 10:
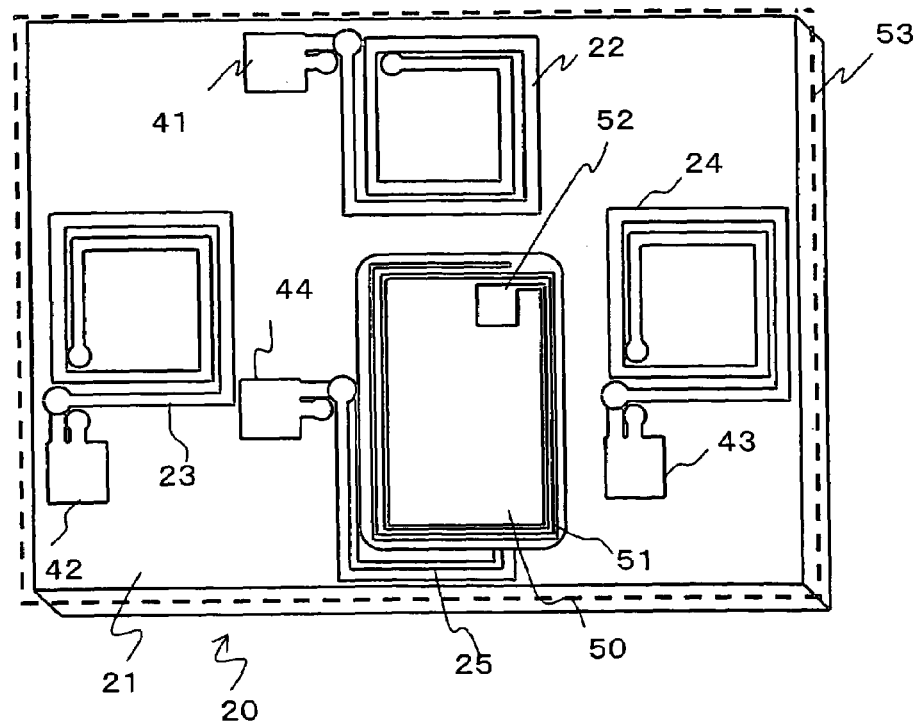
FIG. 10 illustrates an example operation of detecting the location of a non-contact IC card.

Next, an operation of detecting the location of the non-contact IC card 50 will be described. FIG. 10 illustrates the operation of detecting the location of the non-contact IC card 50. In FIG. 10, reference numeral 20 indicates the non-contact IC card reader/writer device, and reference numeral 50 indicates the non-contact IC card. Also, the four antennas 22 through 25 and the corresponding matching circuits 45 through 48 are arranged on the plane of the mouse pad 21 of the non-contact IC card reader/writer device 20.

The matching circuits 45 through 48 perform impedance matching in the antennas 22 through 25. The non-contact IC card 50 includes an internal card antenna 51 and a card controlling circuit 52. Reference numeral 53 indicates the operable range of the non-contact IC card 50.

In this embodiment, the four antennas 22 through 2 are arranged radially on the plane of the mouse pad 21, so as to form four detecting points for the non-contact IC card. Accordingly, the operable range of the non-contact IC card 50 covers the entire plane of the mouse pad 21. Also, a higher detection precision can be achieved.

Next, an operation in accordance with this embodiment will be described. As shown in FIGS. 8 and 10, the control unit 30 of the non-contact IC card reader/writer device 20 drives the four antennas 22 through 25 simultaneously, and outputs transmission data to the transmission units 351, 361, 371, and 381. The transmission units 351, 361, 371, and 381 modulate the supplied transmission data, and amplify the modulated signals. The transmission units 351, 361, 371, and 381 then supply the amplified output signals to the antennas 22, 23, 24, and 25.

Based on the output signals from the transmission units 351, 361, 371, and 381, the antennas 22, 23, 24, and 25 generate electromagnetic waves through alternating current. By doing so, electric waves of such intensities that can be readily detected when the non-contact IC card 50 comes nearby are constantly emitted evenly from the four antennas 22 through 25. Meanwhile, the internal card antenna 51 of the non-contact IC card 50 receives each carrier wave from the non-contact IC card reader/writer device 20, and, in accordance with the bit order of the data to be transmitted, performs communication with the non-contact IC card reader/writer device 20.

When the non-contact IC card reader/writer device 20 detects a carrier wave from the antennas 22 through 25, the A/D converter 44 of each of the reception units 352, 362, 372, and 382, detects the voltage level of the carrier wave modulated at the antennas 22 through 25. The control unit 30 then calculates the location of the non-contact IC card 50 from the four detection values detected by the A/D converters 44. Thus, the location of the non-contact IC card 50 can be detected.

In this embodiment, the antennas 22 through 25 are provided to perform transmission and reception with the non-contact IC card 50, and, based on the intensity of each carrier wave received from the non-contact IC card 50 through the respective antennas 22 through 25, the location of the non-contact IC card 50 is detected. Accordingly, the non-contact IC card 50 can have a pointing function, and can perform various types of input operations with the non-contact IC card reader/writer device 20. Also, the secrecy of cards can be used to prevent limit the types of cards that can perform the "pointing", and thus, security can be provided to the pointing function of the non-contact IC card 50.

Figure 11:
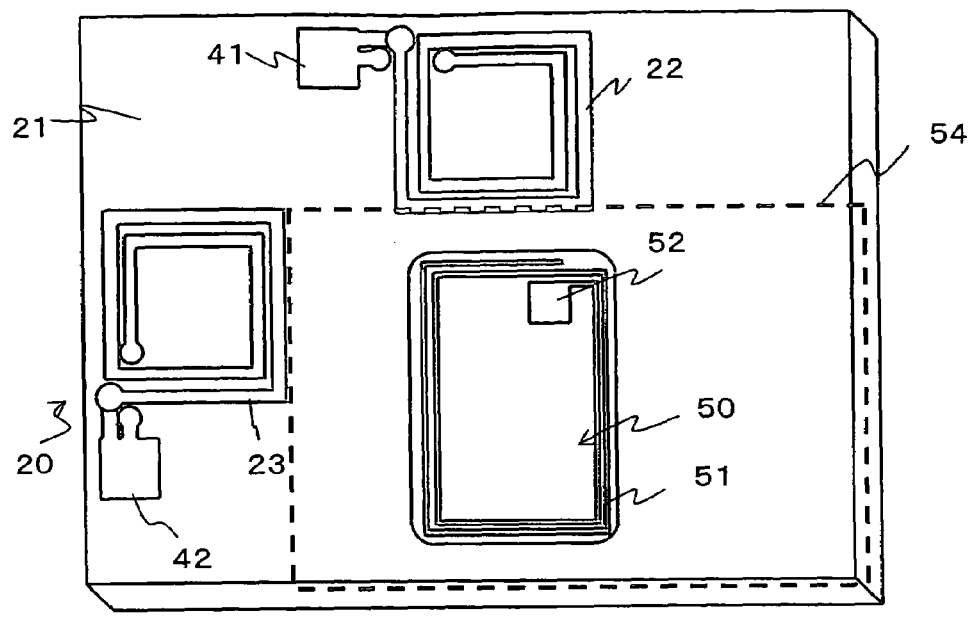
FIG. 11 illustrates another example operation of detecting the location of a non-contact IC card.

In FIGS. 8 and 10, four transmission/reception blocks and four antennas are shown. However, the location of the non-contact IC card 50 can be calculated with only two antennas and two transmission/reception blocks, as shown in FIG. 11. FIG. 11 illustrates another example of an operation of detecting the location of the non-contact IC card 50.

In FIG. 11, reference numeral 20 indicates a non-contact IC card reader/writer device, and reference numeral 50 indicates a non-contact IC card. Two antennas 22 and 23 and the corresponding matching circuits 41 and 42 are arranged on the plane of a mouse pad 21 of the non-contact IC card reader/writer device 20. Also, the non-contact IC card 50 includes an internal card antenna 51 and a card controlling circuit 52. Reference numeral 54 indicates the operable range of the non-contact IC card 50. With the only two antennas, there are only two detecting points for the non-contact IC card 50, and the location of the non-contact IC card 50 cannot be decided on one (as there is another location where the same voltage level can be detected on the other side of the center line connecting the two antennas 22 and 23). As a result, the operable range 54 of the non-contact IC card 50 is restricted to the inside of the dotted line in FIG. 11.

(Second Embodiment)

Next, a second embodiment of the present invention will be described. In the first embodiment, more than one transmission/reception antennas are employed, and the location of a non-contact IC card is detected from the intensity (the voltage level) of each subcarrier wave generated from the card. In this manner, a pointing function is realized in a non-contact IC card. In this embodiment, on the other hand, an A/D converter is provided in a non-contact IC card, and the voltage of each card reception wave is converted by the A/D converter. The digital value of the converted value is transmitted to a non-contact IC card reader/writer device, and the location of the non-contact IC card is detected. In this manner, a pointing function is realized in a non-contact IC card. In this embodiment, the same non-contact IC card reader/writer device as the structure of FIG. 8 is employed.

Figure 12:
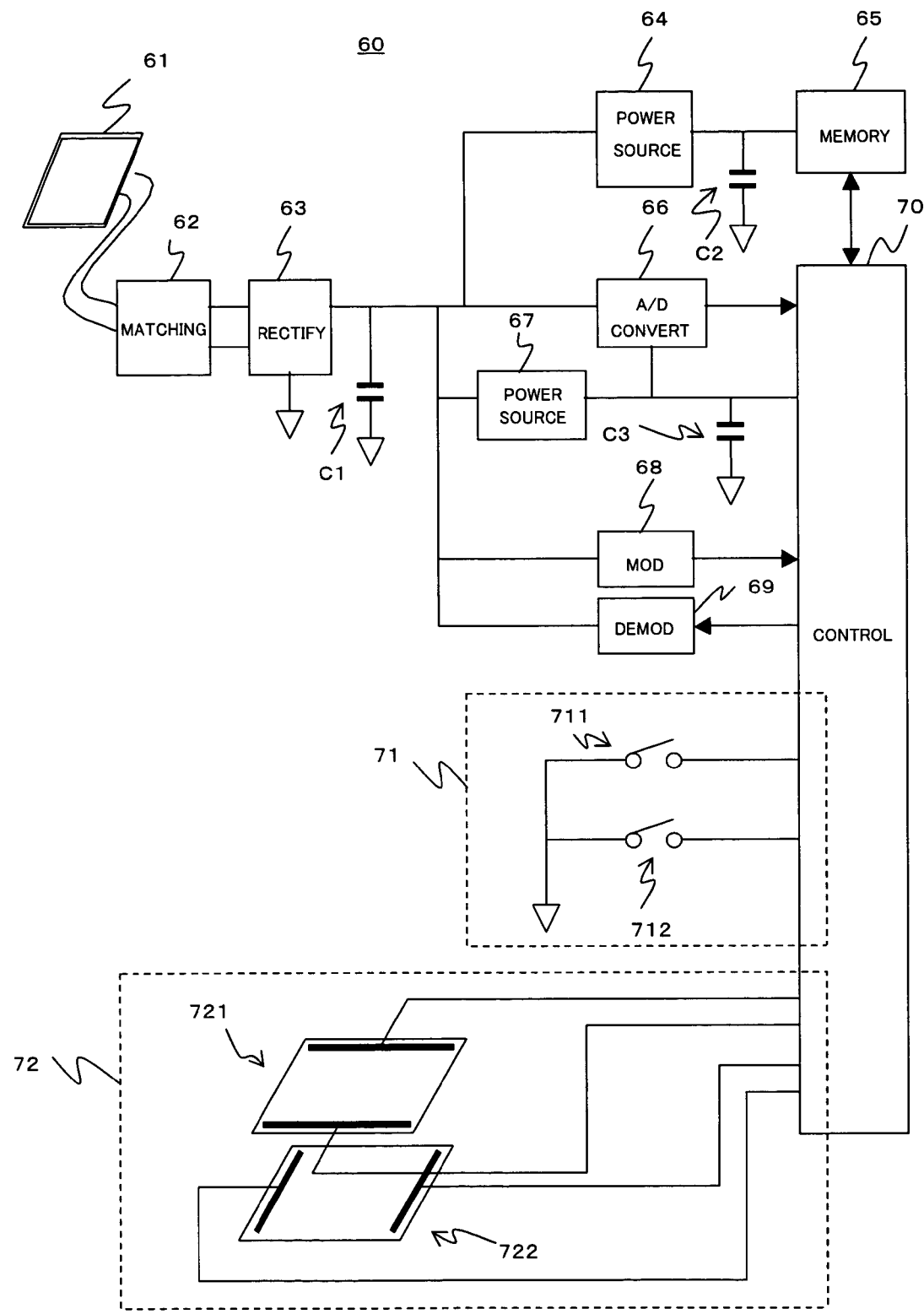
FIG. 12 is a block diagram of the non-contact IC card.

FIG. 12 is a block diagram of the non-contact IC card of this embodiment. As can be seen from FIG. 12, the non-contact IC card 60 includes an antenna 61, a matching circuit 62, a rectifying circuit 63, and a power source unit 64, a memory unit 65, an A/D converting unit 66, a power source unit 67, a demodulating unit 68, a modulating unit 69, a control unit 70, a switching unit 71, and a touch panel unit 72. Also, C1, C2, and C3 indicate capacitors.

The antenna 61 is a loop antenna, and is provided in the non-contact IC card 60. The matching circuit 62 performs impedance matching in the antenna 61. The rectifying circuit 63 is connected to the antenna 61 via the matching circuit 62, and rectifies the alternating current received through the antenna 61 to obtain direct-current power necessary for the circuit unit. The A/D converting unit 66 detects the voltage level of the output of the rectifying circuit 63, and outputs the detected voltage level to the control unit 70.

The power source unit 67 converts electric waves received by the antenna 61 to electric power, so that the non-contact IC card 60 operates with the electric power. The demodulating unit 68 demodulates each reception signal transmitted from the rectifying circuit 63, and outputs the demodulated signal to the control unit 70. The modulating unit 69 modulates transmission data outputted from the control unit 70, and outputs the modulated transmission data to the rectifying circuit 63. The control unit 70 controls the entire non-contact IC card 60. The control unit 70 also outputs switch information detected by the switching unit, in accordance with a request issued from the non-contact IC card reader/writer device 20.

The switching unit 71 is connected to the control unit 70, and includes a right button switch 711 and a left button switch 712. The right button switch 711 and the left button switch 712 are input switches that an operator presses with his/her finger or the like. In this manner, the non-contact IC card 60 may be provided with the switching unit 71. When an operator of the non-contact IC card 60 presses the right button switch 711 or the left button switch 712 with his/her finger or the like, a predetermined timing signal is inputted into the control unit 70

Figure 23A:
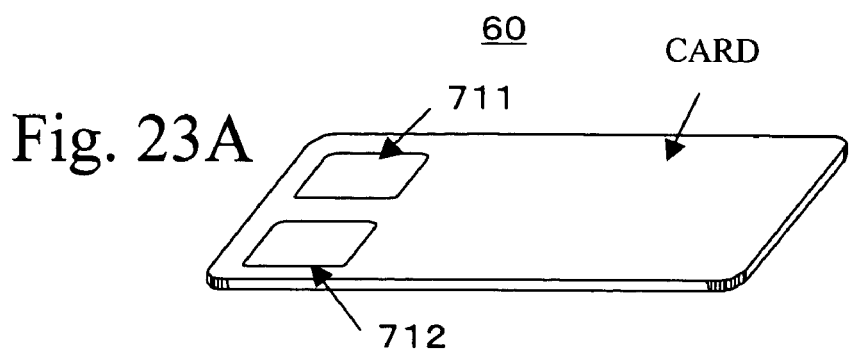
FIGS. 23A and 23B are outline views of a non-contact IC card.
Figure 23B:
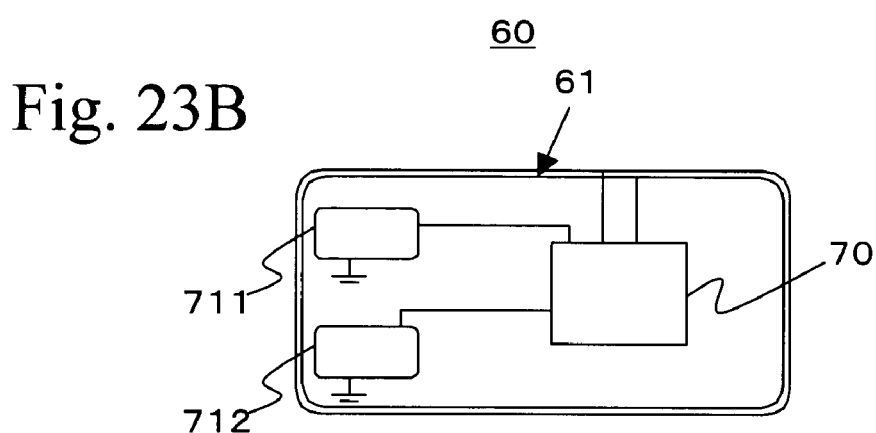

Referring now to FIGS. 23A and 23B, the switching unit 71 of the non-contact IC card 60 will be described. FIG. 23A is an outline view of the non-contact IC card 60. FIG. 23B is a block diagram of the non-contact IC card 60 specifically including the switching unit 71. In FIG. 23A, reference numeral 60 indicates the non-contact IC card, reference numeral 711 indicates the right button switch, and reference numeral 712 indicates the left button switch. In FIG. 23B, reference numeral 60 indicates the non-contact IC card, reference numeral 61 indicates the antenna, reference numeral 711 indicates the right button switch, reference numeral 712 indicates the left button switch, and reference numeral 70 indicates the control unit.

Figure 24:
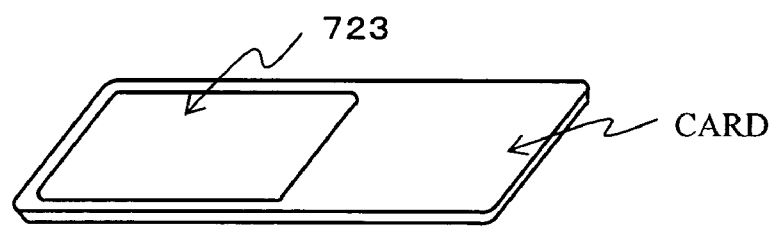
FIG. 24 is an outline view of a non-contact IC card provided with a touch pad.

The touch panel unit 72 is connected to the control unit 70, and includes an upper touch panel 721 and a lower touch panel 722. When an operator touches a touch pad 723 that will be described later, the touch panel unit 72 is used as a coordinate input device. In this manner, the non-contact IC card 60 may be provided with the touch panel unit 72. Referring now to FIG. 24, the touch panel unit 72 mounted to the non-contact IC card 60 will be described.

FIG. 24 is an outline view of the non-contact IC card 60 equipped with a touch pad. As shown in FIG. 24, the touch pad 723 is provided on the surface of the non-contact IC card 60. The touch panel unit 72 shown in FIG. 12 is provided beneath the touch pad 723, and the control unit 70 detects inputs to the upper touch panel 721 and the lower touch panel 722.

The non-contact IC card 60 outputs detected coordinate information, in accordance with a request issued from the non-contact IC card reader/writer device 20. From the obtained coordinate information and the timing of the output of the coordinate information, the non-contact IC card reader/writer device 20 determines a coordinate input function, a switch function, a tapping function, a dragging function, and a scrolling function. Thus, the functions of the touch pad 723 can be realized.

Figure 13:
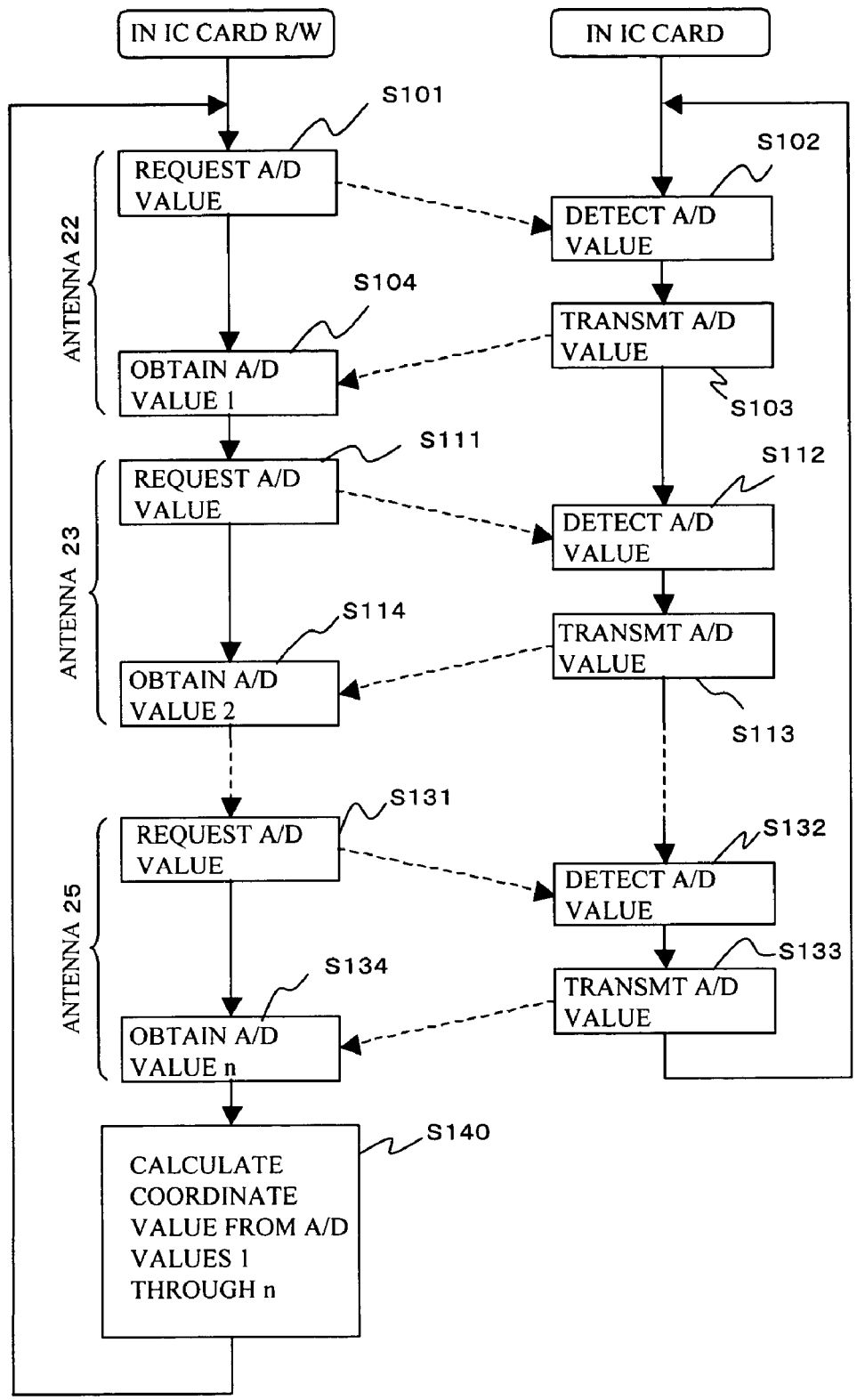
FIG. 13 is a flowchart of an operation of detecting the coordinate values of a non-contact IC card in accordance with a second embodiment of the present invention.

Referring now to FIGS. 8, 12, and 13, an operation in accordance with this embodiment will be described. FIG. 13 is a flowchart of an operation of detecting the coordinate values of the non-contact IC card 60 of this embodiment. In steps S101, S111, and S131, the control unit 30 of the non-contact IC card reader/writer device 20 drives the four antennas 22 through 25 at once, so as to request A/D values from the non-contact IC card 60. By doing so, the control unit 30 outputs a request for an A/D value to each of the transmission units 351, 361, 371, and 381. The transmission units 351, 361, 371, and 381 modulate transmission data supplied from the control unit 30, and amplifies the modulated signals. The amplified output signals are supplied to the antennas 22 through 25, and the request for A/D values is transmitted via the antennas 22 through 25.

In steps S102, S112, and S132, the non-contact IC card 60 receives the A/D value transmission request from the non-contact card reader/writer device 20 via the antenna 61. Regardless of the contents of the reception, the non-contact IC card 60 then A/D converts the voltage level of each carrier wave rectified by the rectifying circuit 63, and obtains A/D values.

In steps S103, S113, and S133, the control unit 70 of the non-contact IC card 60 transmits the digital value of the A/D values, in response to a request issued from the non-contact IC card reader/writer device 20. In steps S104, S114, and S134, the control unit 30 of the non-contact IC card reader/writer device 20 receives four A/D values from the non-contact IC card 60 via the antennas 22 through 25, and the reception units 352, 362, 372, and 382. In step S140, the control unit 30 of the non-contact IC card reader/writer device 20 calculates the coordinate values of the non-contact IC card 60, based on the received four A/D values.

The A/D values received from the non-contact IC card 60 are inversely proportional to the distance between the non-contact IC card 60 and the non-contact IC card reader/writer device 20. Accordingly, the location of the non-contact IC card 60 can be clearly determined. Also, the control unit 30 detects the difference between the calculated coordinate values of the non-contact IC card 60 and the previously calculated coordinate values of the non-contact IC card 60, and sets the difference as relative coordinate values. Here, the relative coordinate values indicate the movement of the non-contact IC card 60.

In this embodiment, the non-contact IC card 60 receives carrier waves that are inversely proportional to the distance from the outside, and detects the voltage level of each of the received carrier wave. The detected voltage level is transmitted to the non-contact IC card reader/writer device 20. Based on the voltage levels, the non-contact IC card reader/writer device 20 calculates the coordinate values of the non-contact IC card 60, and thereby, detects the location of the non-contact IC card 60. In this manner, the non-contact IC card 60 can have a pointing function, and various types of input operations can be performed with the non-contact IC card reader/writer device 20.

Referring now to FIGS. 8 and 12, the switching operation of the non-contact IC card 60 will be described. When the right button switch 711 or the left button switch 712 of the non-contact IC card 60 shown in FIG. 12 is pressed, the corresponding timing signal is detected by the control unit 70. The detected signal is then converted to a predetermined output signal, and is outputted from the control unit 70 to the modulating unit 68. The modulated signal is amplified by an amplifying circuit (not shown), and alternating current is supplied to the antenna 61 so as to generate electromagnetic waves.

The electromagnetic waves are transmitted to the reception units 352, 362, 372, and 382 of the non-contact IC card reader/writer device 20, by virtue of the electromagnetic coupling between the antenna 61 and the antennas 22 through 25 of the non-contact IC card reader/writer device 20. The electromagnetic waves are amplified by the internal amplifying circuit, and are demodulated by the internal demodulating circuit. The amplified and then demodulated electromagnetic waves are transmitted as data to the control unit 30. The data are then converted to signals predetermined between the host device and the input device, and are transferred to the host device.

Figure 25:
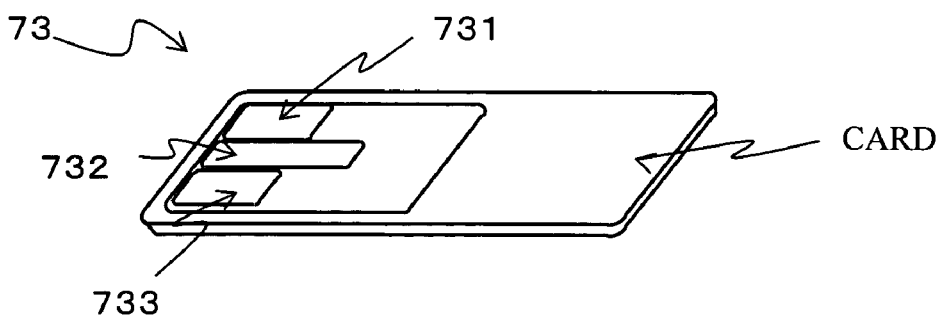
FIG. 25 is an outline view of a non-contact IC card that has switching areas and a separate scrolling area.

In this embodiment, the non-contact IC card 60 includes the switching unit 71 shown in FIG. 23 and the touch pad 723 shown in FIG. 24. However, the non-contact IC card 60 may have a structure shown in FIG. 25. FIG. 25 is an outline view of a non-contact IC card. As shown in FIG. 25, the non-contact IC card 60 includes a touch pad 73. The touch pad 73 includes a right switching area 731, a scrolling area 732, and a left switching area 733.

As shown in FIG. 25, the switching function and the scrolling function are separately provided on the surface of the touch pad 73. The control unit 70 detects contact information in the switching area on the surface of the touch pad 73, and outputs the detected contact information to the non-contact IC card reader/writer device 20. As the non-contact IC card reader/writer device 20 receives the contact information, the switching function is realized.

Figure 22A:
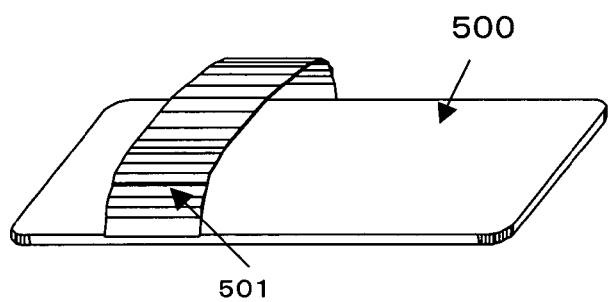
FIG. 22A illustrates an example of a non-contact IC card equipped with a holding member.
Figure 22B:
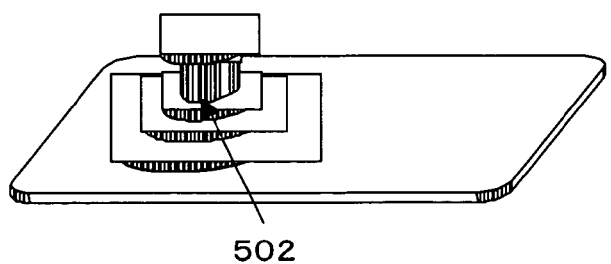
FIG. 22B illustrates another example of a non-contact IC card equipped with a holding member.

A holding member may be provided to the non-contact IC card 60. FIGS. 22A and 22B illustrate examples of non-contact IC cards each provided with a holding member. FIG. 22A shows a holding member 501 that is made of vinyl or the like, and can be attached to a non-contact IC card 500 with adhesive tape. FIG. 22B shows a holding member 502 that is made of plastic or the like, and is mounted to the non-contact IC card 500 with suction cups or the likes.

With either the holding member 501 or 502 attached to the non-contact IC card 500, the poisoning of the non-contact IC card can be easily conducted. Being attached to the non-contact IC card 500 with Velcro (a trade name) or suction cups, the holding members 501 and 502 are detachable. Thus, a non-contact IC card with greater usability can be realized.

(Third Embodiment)

Next, a third embodiment of the present invention will be described. In the first embodiment, the control unit 30 of the non-contact IC card reader/writer device 20 drives the antennas 22 through 25 at once. In this embodiment, however, the control unit 30 sequentially drives the antennas 22 through 25. The non-contact IC card reader/writer device 20 of this embodiment is the same as the structure of FIG. 8, and therefore, will be described with reference to FIGS. 8 and 10. The non-contact IC card of this embodiment is the same as the structure of FIG. 12, and therefore, will be described with reference to FIG. 12.

To request A/D values from the non-contact IC card 60, the control unit 30 of the non-contact IC card reader/writer device 20 drives alternately (sequentially) the four antennas 22 through 25, and outputs a request for an A/D value to each of the transmission units 351, 361, 371, and 381. The transmission units 351, 361, 371, and 381 each modulates the transmission data supplied from the control unit 30, and amplifies the modulated signal. The amplified output signals are supplied to the antennas 22 through 25, from which the A/D value request is transmitted.

Receiving the A/D value request from the non-contact IC card reader/writer device 20 via the antenna 61, the non-contact IC card 60 A/D converts the voltage level of each carrier wave rectified by the rectifying circuit 63, regardless of the received contents. The A/D conversion is performed by the A/D converting unit 66. The control unit 70 of the non-contact IC card 60 then transmits the A/D values in response to the request issued from the non-contact IC card reader/writer device 20.

In accordance with the driven antennas 22 through 25, the reception units 352, 362, 372, and 382, and the received digital values, the control unit 30 of the non-contact IC card reader/writer device 20 determines the distribution of the location of the antennas that have received a response from the non-contact IC card 60. Based on the distribution of the locations of the antennas, the control unit 30 calculates the location of the non-contact IC card 60. Since the A/D values transmitted from the non-contact IC card 60 are inversely proportional to the distance between the non-contact IC card 60 and the non-contact IC card reader/writer device 20, the location of the non-contact IC card 60 can be clearly determined.

(Fourth Embodiment)

Next, a fourth embodiment of the present invention will be described. In this embodiment, transmission/reception antennas that are arranged at uniform intervals on a mouse pad are sequentially driven so as to detect the location of a non-contact IC card from the antennas that have received a response. In this manner, the pointing function of the non-contact IC card can be realized. In this embodiment, the non-contact IC card is the same as the structure of FIG. 12, and therefore, will be described with reference to FIG. 12.

Figure 14:
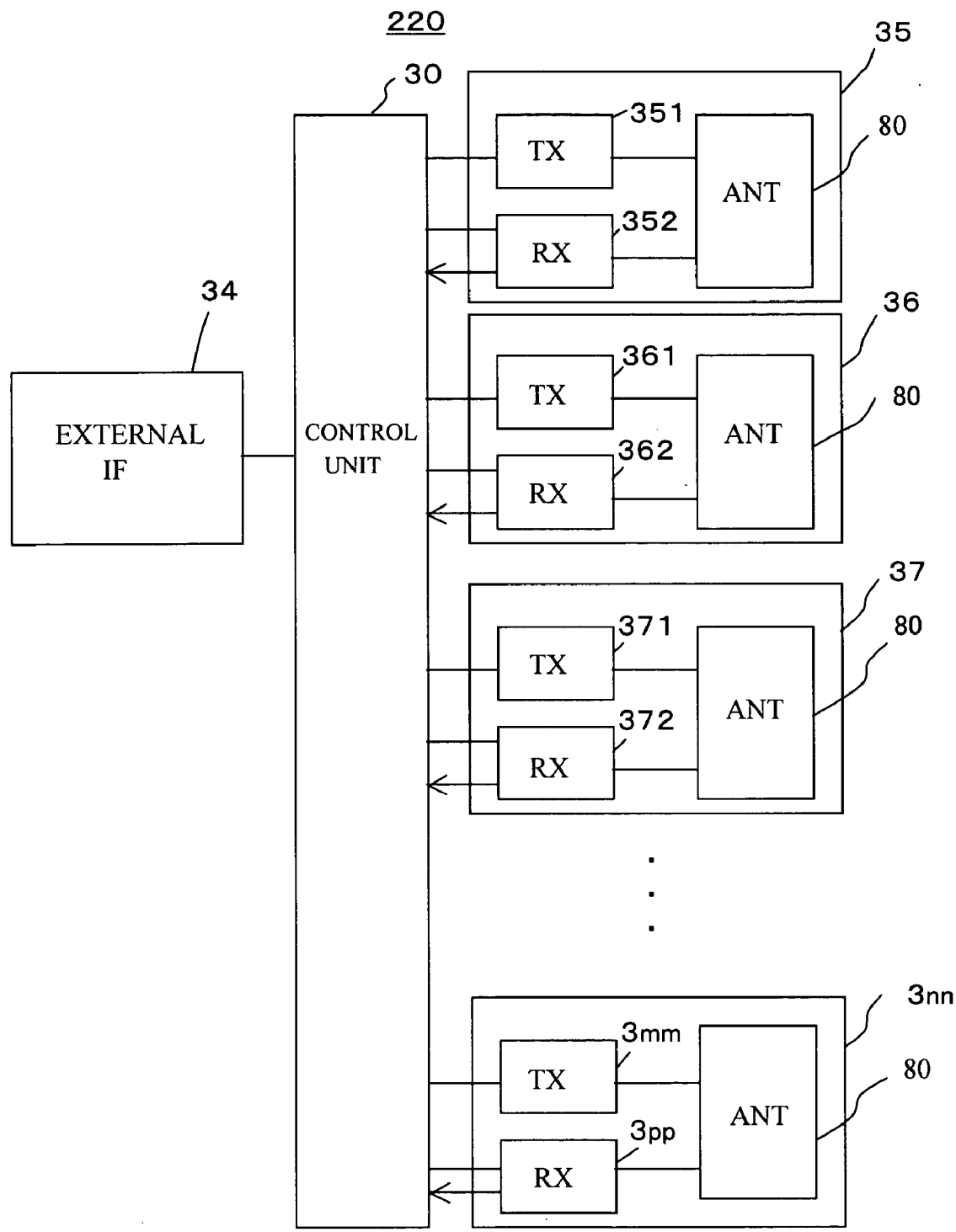
FIG. 14 illustrates a non-contact IC card reader/writer device in accordance with a fourth embodiment of the present invention.
Figure 15:
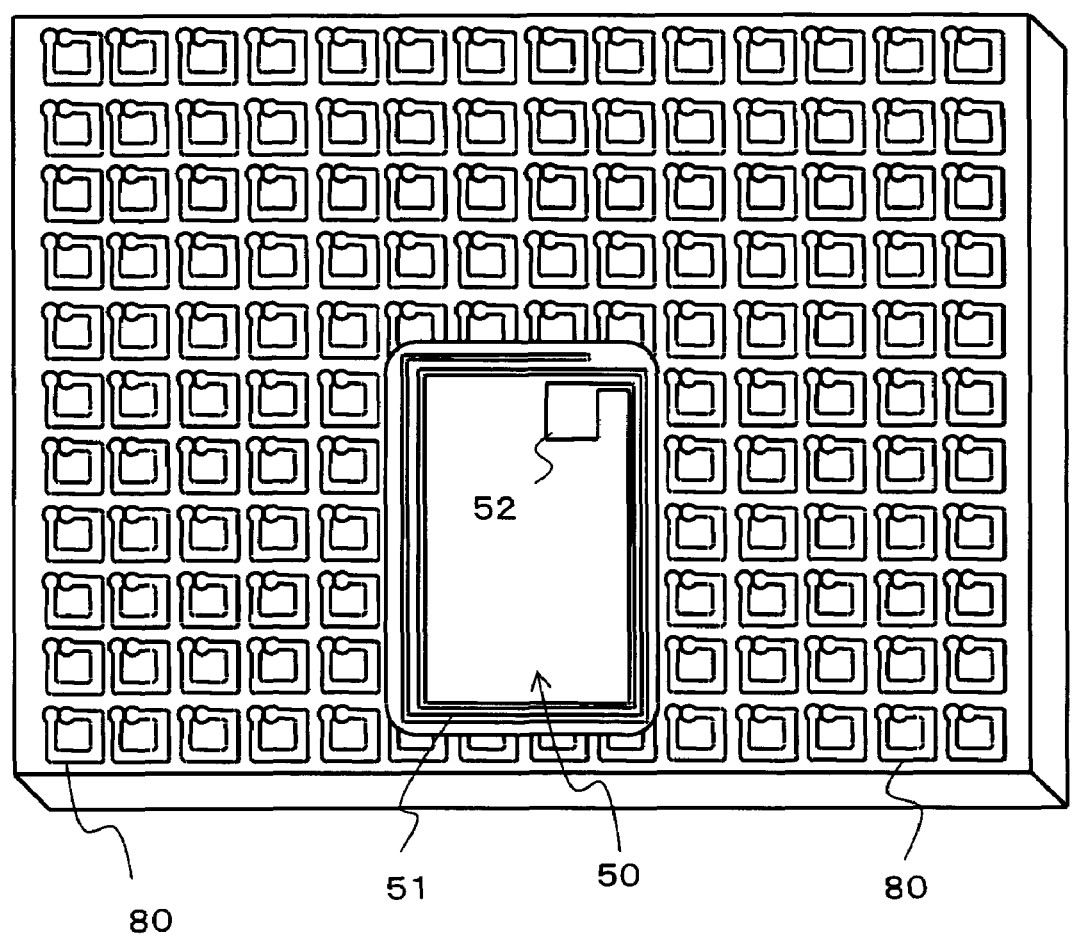
FIG. 15 illustrates an operation of detecting the location of a non-contact IC card in accordance with the fourth embodiment of the present invention.

FIG. 14 illustrates a non-contact IC card reader/writer device 220 of this embodiment. This non-contact IC card reader/writer device 220 includes a large number of transmission/reception blocks 35 through 3$nn$, and each of the transmission/reception blocks 35 through 3$nn$ includes an antenna 80. FIG. 15 illustrates an operation of detecting the location of a non-contact IC card. As shown in FIG. 15, coil antennas 80 are arranged at uniform intervals on the plane of the mouse pad 21.

Figure 16:
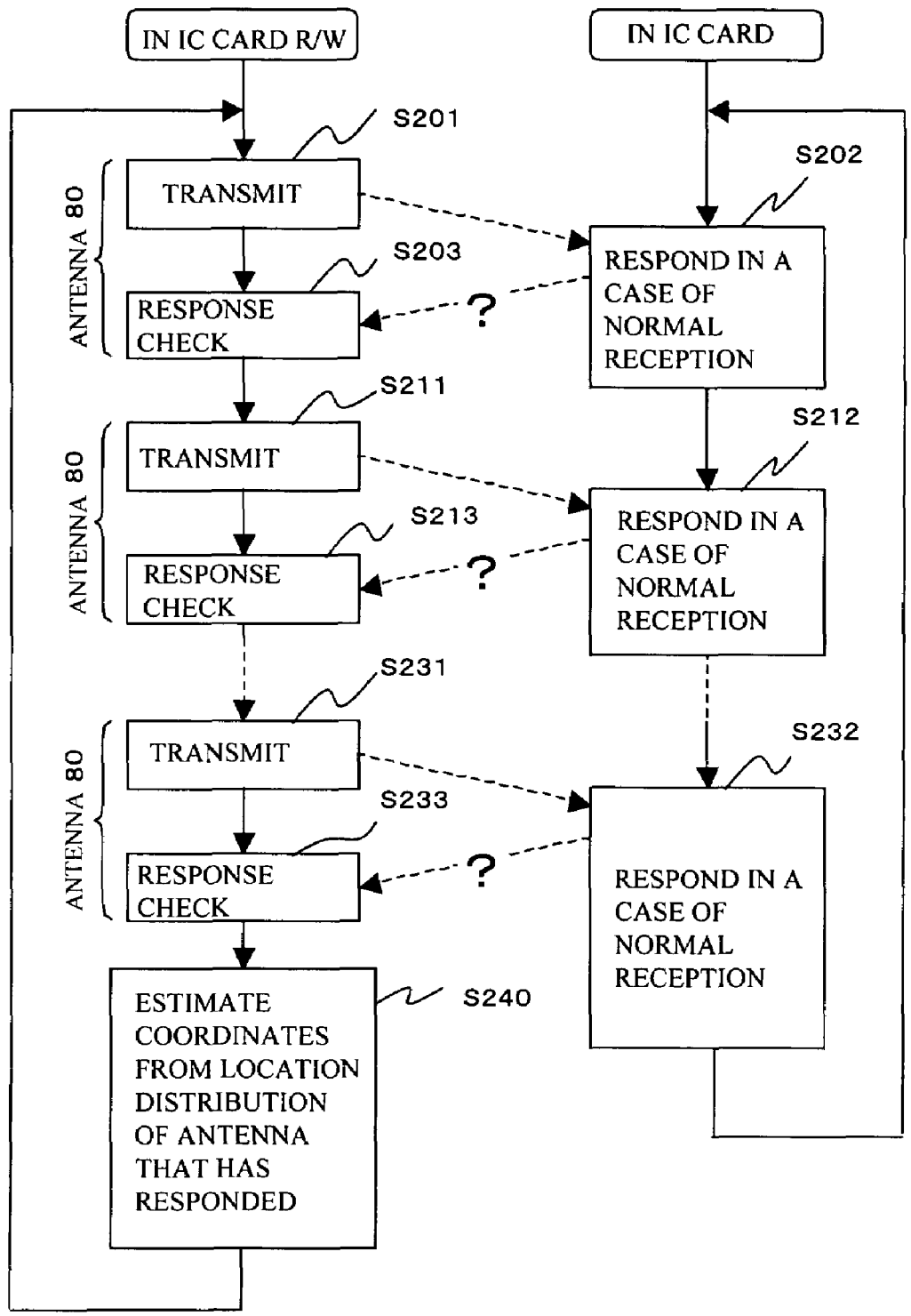
FIG. 16 is a flowchart of an operation of the non-contact IC card system in accordance with the fourth embodiment.

Referring now to FIG. 16, an operation in accordance with this embodiment will be described. FIG. 16 is a flowchart of an operation of a non-contact IC card system of this embodiment. In steps S201, S211, and S231, to drive the antennas 80 sequentially, the control unit 30 of the non-contact IC card reader/writer device 220 outputs transmission data to the transmission units 351, 361, 371, . . . , 3mm. Each of the transmission units 351, 361, 371, . . . , 3mm modulates the transmission data supplied from the control unit 30, and amplifies the modulated signal. The amplified output signal is then supplied to the corresponding antenna 80. In this manner, data transmission to the non-contact IC card 50 is performed.

In steps S202, S212, and S232, if the reception in the non-contact IC card 50 is normal, the internal card antenna 51 receives each carrier wave. In accordance with the bit order of the data to be transmitted, communication with the non-contact IC card reader/writer device 220 is performed to send a response to the non-contact IC card reader/writer device 220. In steps S203, S213, and S233, the non-contact IC card reader/writer device 220 determines whether there is a response from the non-contact IC card 50 via each of the antennas 80 that are sequentially driven.

In step S240, the control unit 30 estimates the coordinates of the non-contact IC card 50 from the distribution of the locations of the antennas that have received a response. Based on the distribution of the locations of the antennas that have received a response from the non-contact IC card 50, the coordinates of the non-contact IC card 50 are estimated. Thus, a pointing function can be realized with the non-contact IC card 50, and various types of input operations can be performed with the non-contact card reader/writer device 220.

(Fifth Embodiment)

Next, a fifth embodiment of the present invention will be described. In a pointing device of this embodiment, transmission/reception antennas that are arranged at uniform intervals on a mouse pad are simultaneously driven so as to detect the location of a non-contact IC card from the intensity of each subcarrier wave. The non-contact IC card reader/writer device 220 of this embodiment has the same structure as the structure of FIG. 14, and therefore, will be described with reference to FIG. 14. The reception units of the non-contact card reader/writer device 20 of this embodiment each has the same structure as the structure of FIG. 9, and therefore, will be described with reference to FIG. 9. The non-contact IC card reader/writer device 20 of this embodiment has the same structure as the structure of FIG. 15, and therefore, will be described with reference to FIG. 15. The non-contact IC card of this embodiment has the same structure as the structure of FIG. 12, and therefore, will be described with reference to FIG. 12.

Figure 17:
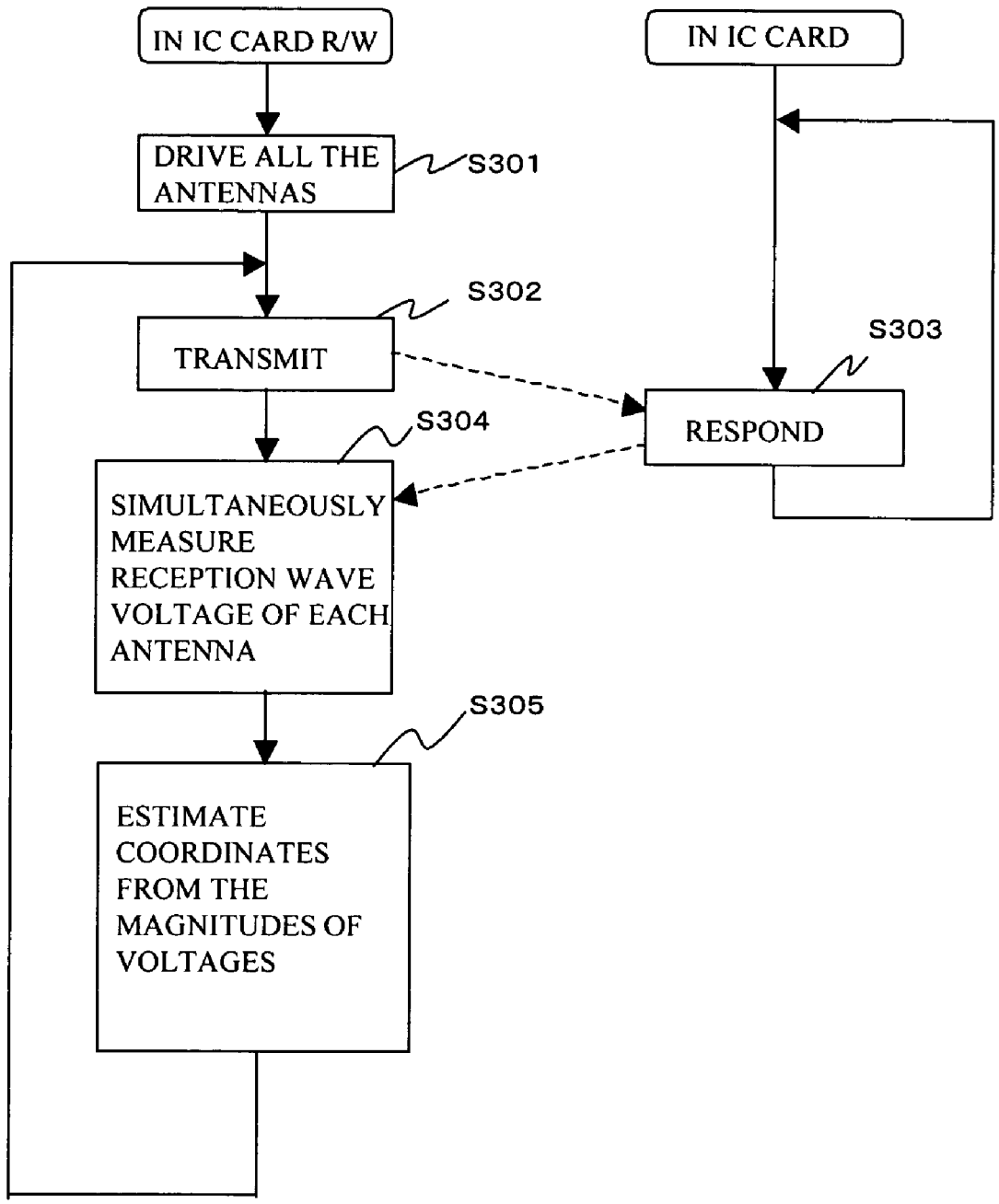
FIG. 17 is a flowchart of an operation of a non-contact IC card system in accordance with a fifth embodiment of the present invention.

Referring now to FIG. 17, an operation in accordance with this embodiment will be described. FIG. 17 is a flowchart of an operation of a non-contact IC card system of this embodiment. In step S301, to drive all the antennas 80 at once, the control unit 30 of the non-contact IC card reader/writer device 220 outputs transmission data to the transmission units 351, 361, 371, . . . , 3mm. Each of the transmission units 351, 361, 371, . . . , 3mm modulates the transmission data supplied from the control unit 30, and amplifies the modulated signal. The amplified output signals are supplied to the antennas 80.

In step S302, the antennas 80 transmit data to the non-contact IC card 50. In step S303, if the reception in the non-contact IC card 50 is normal, the internal card antenna 51 receives each carrier wave. In accordance with the bit order of the data to be transmitted, communication with the non-contact IC card reader/writer device 220 is performed so as to send a response to the non-contact IC card reader/writer device 220.

In step S304, the A/D converters 44 of the reception units 352, 362, 372, . . . , 3pp shown in FIG. 9 convert the voltage levels of carrier waves at antennas 80 that have received data from the non-contact IC card 50. Thus, the non-contact IC card reader/writer device 220 detects A/D values. The control unit 30 receives the A/D values from the A/D converters 44, and measures the voltage of each electric wave received through the antennas 80.

In step S305, the control unit 30 estimates the coordinates of the non-contact IC card 50 from the voltage intensities. Here, the control unit 30 recognizes the antenna 80 having the highest reception wave voltage as the center of the non-contact IC card 50. In this manner, the coordinates of the non-contact IC card 50 are estimated from the center of the non-contact IC card 50. Accordingly, the non-contact IC card 50 can have a pointing function, and various types of input operations can be performed with the non-contact IC card reader/writer device 220.

(Sixth Embodiment)

Next, a sixth embodiment of the present invention will be described. In this embodiment, a transmission/reception antenna and an optical mouse positioning sensor are provided to a non-contact IC card reader/writer device to detect the card information and the location of a non-contact IC card. The non-contact IC card of this embodiment has the same structure as the structure of FIG. 12, and therefore, will be described with reference to FIG. 12.

Figure 18:
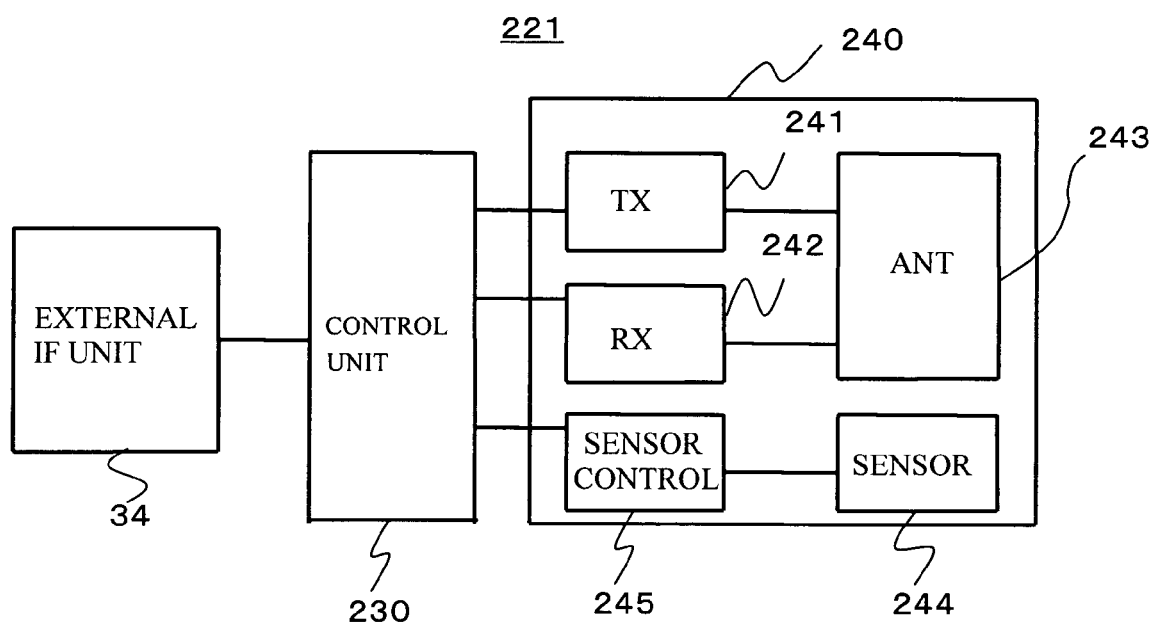
FIG. 18 is a block diagram of a non-contact IC card reader/writer device in accordance with a sixth embodiment of the present invention.

FIG. 18 is a block diagram of a non-contact IC card reader/writer device 221 of this embodiment. As shown in FIG. 18, the non-contact IC card reader/writer device 221 includes an external interface unit 34, a control unit 230, and a transmission/reception block 240. The transmission/reception block 240 includes a transmission unit 241, a reception unit 242, an antenna 243, a sensor unit 244, and a sensor control unit 245. The sensor unit 244 is an optical mouse positioning sensor that includes a LED, an optical stick, and a chip for optically detecting the movement of a non-contact IC card on the operating surface, though not shown in the drawings.

Figure 19:
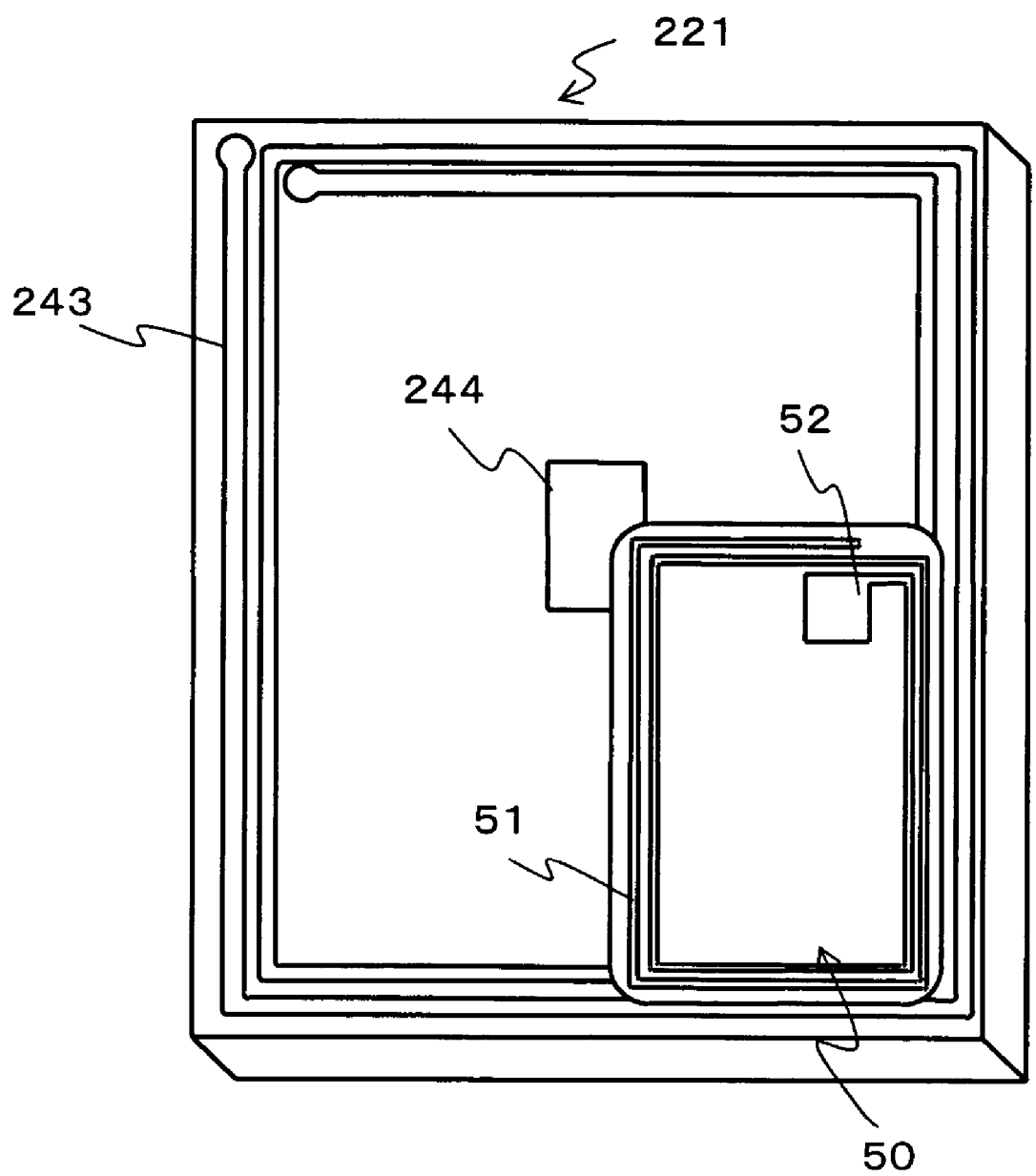
FIG. 19 illustrates an operation of detecting the location of a non-contact IC card in accordance with the sixth embodiment of the present invention.

Referring now to FIG. 19, an operation of detecting the location of a non-contact IC card in accordance with this embodiment will be described. The structure of FIG. 19 corresponds to the structure of FIG. 18. As shown in FIG. 19, the non-contact IC card reader/writer device 221 includes an antenna 243 that is a coil antenna, and an optical mouse positioning sensor 244. The non-contact IC card 50 includes an internal card antenna 51 and a card control circuit 52.

The non-contact IC card reader/writer device 221 receives regular IC card information through the antenna 243, and detects the location of the non-contact IC card 50 by virtue of the optical mouse positioning sensor 244. In this structure, the non-contact IC card 50 can have a pointing function, and various types of input operations can be performed with the non-contact IC card reader/writer device 221.

(Seventh Embodiment)

Next, a seventh embodiment of the present invention will be described. In this embodiment, four transmission/reception antennas and four Hall elements are radially arranged at four locations. The antennas detect card information, and the Hall elements detect the voltage levels of subcarrier waves, so as to calculate the location of a non-contact IC card. The non-contact IC card 50 of this embodiment has the same structure as the structure of FIG. 12, and therefore, will be described with reference to FIG. 12.

Figure 20:
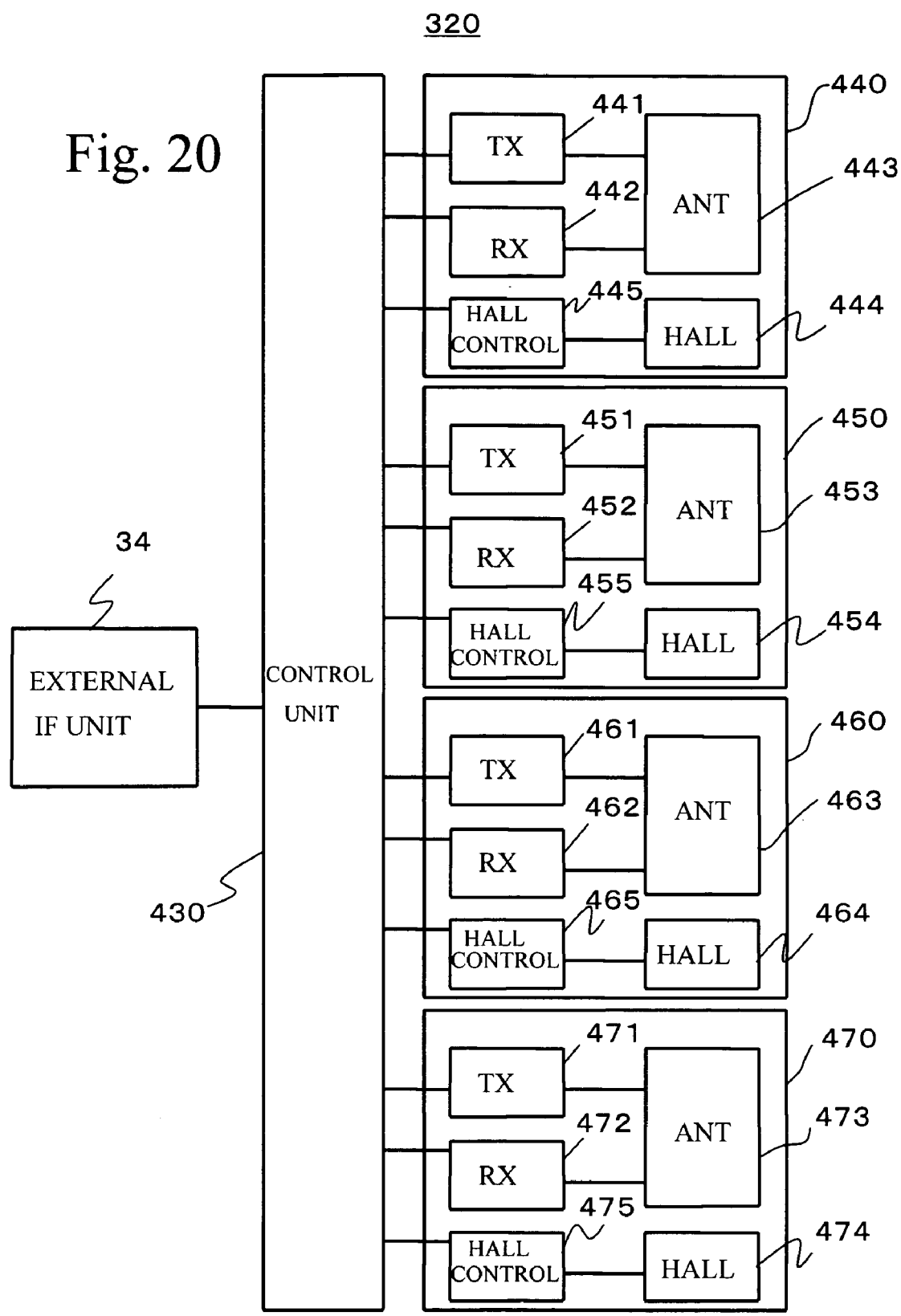
FIG. 20 is a block diagram of a non-contact IC card reader/writer device in accordance with a seventh embodiment of the present invention.

FIG. 20 is a block diagram of a non-contact IC card reader/writer device 320 of this embodiment. As shown in FIG. 20, the non-contact IC card reader/writer device 320 includes an external interface unit 34, a control unit 430, and transmission/reception blocks 440, 450, 460, and 470. The transmission/reception blocks 440, 450, 460, and 470 include transmission units 441, 451, 461, and 471, reception units 442, 452, 462, and 472, coil antennas 443, 453, 463, and 473, Hall elements 444, 454, 464, and 474, and Hall element control units 445, 455, 465, and 475, respectively.

The Hall elements 444, 454, 464, and 474 detect changes in the field intensity due to the non-contact IC card 50 on the antenna plane. The Hall element control units 445, 455, 465, and 475 detect the outputs of the Hall elements 444, 454, 464, and 474, respectively.

Figure 21:
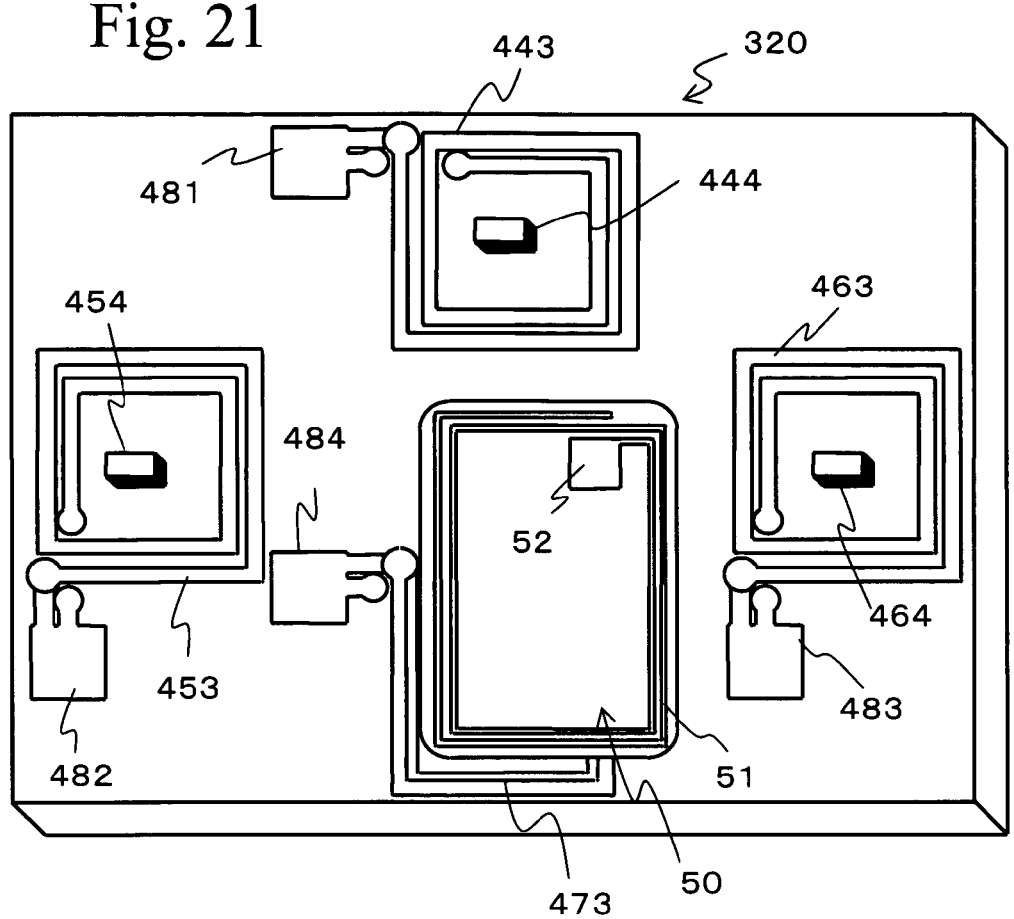
FIG. 21 illustrates an operation of detecting the location of a non-contact IC card.

Referring now to FIG. 21, an operation of detecting the location of the non-contact IC card 50 in accordance with this embodiment will be described. The structure of FIG. 21 corresponds to the structure of FIG. 20. As shown in FIG. 21, the non-contact IC card reader/writer device 320 includes coil antennas 443, 453, 463, and 473, matching circuits 481, 482, 483, and 484, and Hall elements 444, 454, 464, and 474 (not shown).

The non-contact IC card 50 includes an internal card antenna 51 and a card control circuit 52. As shown in FIGS. 20 and 21, the four antennas 443, 453, 463, and 473 are radially arranged at four locations on the same plane, and the Hall elements 444, 454, 464, and 474 are each placed in the center of the corresponding one of the antennas 443, 453, 463, and 473. The non-contact IC card reader/writer device 320 receives regular IC card information through the antennas 443, 453, 463, and 473. From the outputs of the four Hall elements 44, 454, 464, and 474, the non-contact IC card reader/writer device 320 also detects changes in the field intensity on the antenna plane caused by the non-contact IC card 50. Based on the changes in the field intensity, the location of the non-contact IC card 50 is calculated.

As described above, the non-contact IC card reader/writer device 320 of this embodiment includes a large number of antennas and Hall elements. When data are transmitted from the non-contact IC card 50 to the non-contact IC card reader/writer device 320, the levels of carrier waves received by the antennas 443, 453, 463, and 473 of the non-contact IC card reader/writer device 320 change due to the carrier waves transmitted from the non-contact IC card 50.

In this embodiment, to measure the changes in the levels of carrier waves generated from the internal card antenna 51, the Hall elements 444, 454, 464, and 474 are each arranged in the center of each corresponding one of the antennas 443, 453, 463, and 473, so as to detect changes in the field intensity. The location of the non-contact IC card 50 is detected through the Hall elements 444, 454, 464, and 474. Meanwhile, data transmission and reception are performed through the antennas 443, 453, 463, and 473.

Although A/D values are observed in the foregoing embodiments, the magnetic field formed by the carrier waves generated from the internal card antenna 51 is sensed by the Hall elements 444, 454, 464, and 474 in this embodiment. Accordingly, field intensity changes can be detected through the Hall elements 444, 454, 464, and 474, and the location of the non-contact IC card 50 can be detected without an A/D converter.

In this embodiment, information transmission and reception with the non-contact IC card 50 are performed through the antennas 443, 453, 463, and 473, and field intensity changes on the antenna plane are detected through the Hall elements 444, 454, 464, and 474. As the location of the non-contact IC card 50 is calculated from the field intensity changes, the non-contact card 50 can have a pointing function. Thus, various types of input operations can be performed with the non-contact IC card reader/writer device 320.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-contact IC card reader/writer device, comprising:
   antennas that perform transmission and reception of carrier waves between the non-contact IC card reader/writer device and a non-contact IC card; and
   a control unit to process signals obtained from the antennas and to calculate a location of the non-contact card; wherein:
   the antennas are arranged in a matrix on one plane; and
   the control unit alternately drives the antennas, obtains location information from the non-contact IC card and, based thereon, calculates the two dimensional location of the non-contact IC card on said one plane, and detects a difference between successive locations of the non-contact IC card to provide a pointing function based on movement of the non-contact IC card.

2. A non-contact IC card reader/writer device, comprising:
   antennas that perform transmission and reception of carrier waves between the non-contact IC card reader/writer device and a non-contact IC card; and
   a control unit to process signals obtained from the antennas and to calculate a location of the non-contact card; wherein:
   the antennas are arranged in a matrix on one plane; and
   the control unit sequentially drives the antennas, calculates the two-dimensional location of the non-contact IC card on said one plane based on the distribution of the locations of the antennas that have received a response from the non-contact IC card, and detects a difference between successive locations of the non-contact IC card to provide a pointing function based on movement of the non-contact IC card.

3. A non-contact IC card reader/writer device, comprising:
   antennas that perform transmission and reception of carrier waves between the non-contact IC card reader/writer device and a non-contact IC card; and
   a control unit to process signals obtained from the antennas and to calculate a location of the non-contact card; wherein:
   the antennas are arranged in a matrix on one plane, and further comprising:
   a detector that drives all the antennas at once, and detects the voltage level of each of the carrier waves received from the non-contact IC card via the antennas; and
   the control unit calculates the two-dimensional location of the non-contact IC card on said one plane, based on the voltage levels detected by the detector and the locations of antennas that have received the carrier waves, and detects a difference between successive locations of the non-contact IC card to provide a pointing function based on movement of the non-contact IC card.

4. An input device, comprising:
- a non-contact IC card reader/writer device;
- antennas that perform transmission and reception of carrier waves between the non-contact IC card reader/writer device and a non-contact IC card;
- a detector that detects the voltage level of each of the carrier waves received from the non-contact IC card via the antennas which are arranged in a matrix on one plane; and
- a control unit that drives the antennas so that the antennas are alternatively, sequentially, or simultaneously driven, calculates a two-dimensional location of the non-contact IC card on said one plane from communications with the non-contact IC card, and detects a difference between successive locations of the non-contact IC card to provide a pointing function based on movement of the non-contact IC card.

5. A method of detecting the location of a non-contact IC card, comprising:
- performing carrier wave transmission and reception with the non-contact IC card through sequential driving of antennas arranged in a matrix on one plane;
- processing signals obtained from carrier waves received by the antennas and calculating the location of the non-contact IC card, based on distribution of the locations of antennas that have received a response from the non-contact IC card; and
- detecting a difference between successive locations of the non-contact IC card to provide a pointing function based on movement of the non-contact IC card.

6. A method of detecting the location of a non-contact IC card, comprising:
- performing carrier wave transmission and reception with the non-contact IC card through simultaneous driving of antennas arranged in a matrix on one plane;
- detecting the voltage level of each carrier wave received from the non-contact IC card through the antennas;
- processing signals obtained from carrier waves received by the antennas and calculating the location of the non-contact IC card, based on the voltage levels detected in the detecting step and the locations of antennas that have received the carrier waves; and
- detecting a difference between successive locations of the non-contact IC card to provide a pointing function based on movement of the non-contact IC card.

7. A method of detecting a location of a non-contact IC card, the method comprising:
- performing carrier wave transmission and reception with the non-contact IC card through antennas of a non-contact IC card reader/writer device arranged in a matrix on one plane;
- driving the antennas so that the antennas are alternatively, sequentially, or simultaneously driven;
- calculating a two-dimensional location of the non-contact IC card on said one plane from communications with the non-contact IC card;
- detecting an input operation performed on a touch pad by an operator, by detecting a difference between successive locations of the non-contact IC card to provide a pointing function based on movement of the non-contact IC card; and
- outputting input information detected from the touch pad, in response to a request issued from a device provided outside of the non-contact IC card reader/writer device.

8. A non-contact IC card reader/writer device, comprising:
- antennas that perform transmission and reception of carrier waves between the non-contact IC card reader/writer device and a non-contact IC card; and
- a control unit that drives the antennas so that the antennas are alternatively, sequentially, or simultaneously driven, calculates a two-dimensional location of the non-contact IC card on one plane from communications with the non-contact IC card, and detects a difference between successive locations of the non-contact IC card to provide a pointing function based on movement of the non-contact IC card.

9. A method of detecting a location of a non-contact IC card, comprising:
- performing carrier wave transmission and reception with the non-contact IC card through antennas of a non-contact IC card reader/writer device arranged in a matrix on one plane;
- sequentially driving the antennas;
- calculating a two-dimensional location of the non-contact IC card on said one plane from communications with the non-contact IC card; and
- detecting a difference between successive locations of the non-contact IC card to provide a pointing function based on movement of the non-contact IC card.

* * * * *

UNITED STATES PATENT AND TRADEMARK OFFICE
CERTIFICATE OF CORRECTION

| | | |
|---|---|---|
| PATENT NO. | : 7,232,068 B2 | Page 1 of 1 |
| APPLICATION NO. | : 10/625772 | |
| DATED | : June 19, 2007 | |
| INVENTOR(S) | : Takuya Uchiyama et al. | |

It is certified that error appears in the above-identified patent and that said Letters Patent is hereby corrected as shown below:

Column 18, Line 11, after "operation" insert --,--.

Signed and Sealed this

Thirteenth Day of November, 2007

JON W. DUDAS
*Director of the United States Patent and Trademark Office*